US012654141B2

(12) United States Patent
Goharzadeh et al.

(10) Patent No.: US 12,654,141 B2
(45) Date of Patent: Jun. 16, 2026

(54) MONODISPERSED MICROBUBBLES PRODUCTION USING A MODIFIED MICRO-VENTURI BUBBLE GENERATOR

(71) Applicant: Khalifa University of Science and Technology, Abu Dhabi (AE)

(72) Inventors: Afshin Goharzadeh, Abu Dhabi (AE); Vishnubhadran Ramabhadran Surendranathan Ramabhadran, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 757 days.

(21) Appl. No.: 17/910,142

(22) PCT Filed: Mar. 11, 2021

(86) PCT No.: PCT/IB2021/052060
§ 371 (c)(1),
(2) Date: Sep. 8, 2022

(87) PCT Pub. No.: WO2021/181342
PCT Pub. Date: Sep. 16, 2021

(65) Prior Publication Data

US 2023/0096069 A1 Mar. 30, 2023

Related U.S. Application Data

(60) Provisional application No. 63/070,928, filed on Aug. 27, 2020, provisional application No. 62/987,930, filed on Mar. 11, 2020.

(51) Int. Cl.
*B01F 25/00* (2022.01)
*B01F 23/232* (2022.01)
(Continued)

(52) U.S. Cl.
CPC .... *B01F 25/31242* (2022.01); *B01F 23/2323* (2022.01); *B01F 23/2373* (2022.01);
(Continued)

(58) Field of Classification Search
CPC ............ B01F 25/31242; B01F 23/2373; B01F 23/2323; B01F 33/30; B01F 3/502784;
(Continued)

(56) References Cited

U.S. PATENT DOCUMENTS

2004/0247767 A1 12/2004 Fischer et al.
2013/0214436 A1* 8/2013 Mori ................ B01F 25/31242 261/19
(Continued)

OTHER PUBLICATIONS

Kim, Hyun-Sik, et al., "Effects of Distance of Breaker Disk on Performance of Ejector Type Microbubble Generator", KSCE Journal of Civil Engineering, 2018, vol. 22, No. 4, figure 2(a), 2018, pp. 1096-1100.
(Continued)

*Primary Examiner* — Anshu Bhatia
(74) *Attorney, Agent, or Firm* — Billion & Armitage

(57) ABSTRACT

Embodiments include microfluidic devices and related methods. A microfluidic device for producing microbubbles may include a first microfluidic channel for supplying a continuous phase fluid, the first microfluidic channel including a convergent section and a constant-width section downstream from the convergent section, wherein the constant-width section discharges into a junction; a second microfluidic channel for supplying a dispersed phase fluid, the second microfluidic channel including an orthogonal section oriented orthogonal to the constant-width section, wherein the orthogonal section discharges into the junction; and a third microfluidic channel for conveying produced microbubbles, the third microfluidic channel including a
(Continued)

divergent section, wherein the junction discharges into the divergent section.

19 Claims, 16 Drawing Sheets

(51) Int. Cl.
*B01F 23/2373* (2022.01)
*B01F 25/312* (2022.01)
*B01F 33/30* (2022.01)
*B01L 3/00* (2006.01)
*B01F 101/00* (2022.01)

(52) U.S. Cl.
CPC ........ *B01F 33/30* (2022.01); *B01L 3/502784* (2013.01); *B01F 2101/305* (2022.01); *B01F 2215/045* (2013.01); *B01F 2215/0468* (2013.01); *B01L 2300/0861* (2013.01); *B01L 2400/0487* (2013.01)

(58) Field of Classification Search
CPC .......... B01F 2101/305; B01F 2215/045; B01L 2300/0861; B01L 2400/0487
See application file for complete search history.

(56) References Cited

U.S. PATENT DOCUMENTS

2018/0001282 A1 1/2018 Van Hoeve et al.
2018/0008951 A1 1/2018 Van Hoeve et al.

OTHER PUBLICATIONS

Li, Xiaolei, et al., “Dynamic characteristics of ventilated bubble moving in micro scale venturi”, Chemical Engineering and Processing 100, 2016, 79-86.
International Search Report and Written Opinion Received for PCT Application No. PCT/IB2021/052060, mailed on Jun. 21, 2021.
Microlithography, Science and Technology, Second Edition, Optical Science and Engineering, 2007.
Abate, Adam R., et al., “Glass coating for PDMS microfluidic channels by sol-gel methods”, RSC Publishing, Lab on a Chip, Feb. 20, 2008, 1-6.
Abdulaziz, A.M., et al., “Performance and image analysis of a cavitating process in a small type venturi”, Experimental Thermal and Fluid Science 53 (2014) 40-48.
Akbar, M. K., et al., “Gas-Liquid Two-Phase Flow Regimes in Microchannels”, Proceedings of IMECE2002, ASME International Mechanical Engineering Congress & Exposition, Nov. 2022.
Ali, Rashid, et al., “Study of Flow Boiling Characteristics of a MicroChannel Using High Speed Visualization”, Journal of Heat Transfer, vol. 135, Aug. 2013, 081501-1-081501-8.
Berdichevsky, Yevgeny, et al., “UV/ozone modification of poly(dimethylsiloxane) microfluidic channels”, Sensors and Actuators B 97 (2004) 402-408.
Bourbaba, Houaria, et al., “Mechanical behavior of polymeric membrane: comparison between PDMS and PMMA for micro fluidic application”, Energy Procedia 36 ( 2013 ) 231-237.
Bredwell, Marshall D., et al., “Mass-Transfer Properties of Microbubbles. 1. Experimental Studies”, Biotechnol. Prog. 1998, 14, 31-38.
Bull, Joseph L., “The application of microbubbles for targeted drug delivery”, Expert Opin. Drug Deliv. (2007) 4(5), 475-493.
Cho, Sung Chan, et al., “International Journal of Heat and Mass Transfer 70 (2014) 340-352”, Two-phase flow dynamics in a micro hydrophilic channel: A theoretical and experimental study.
Choi, Chiwoong, et al., “Surface wettability effect on flow pattern and pressure drop in adiabatic two-phase flows in rectangular microchannels with T-junction mixer”, Experimental Thermal and Fluid Science 35 (2011) 1086-1096.
Chu, Li-Bing, et al., “Enhanced sludge solubilization by microbubble ozonation”, Chemosphere 72 (2008) 205-212.
Chu, Li-Bing, et al., “Enhanced treatment of practical textile wastewater by microbubble ozonation”, Process Safety and Environment Protection 86 (2008) 389-393.
Chuma, Hiroyuki, et al., “Increasing complexity and limits of organization in the microlithography industry: implications for science-based industries”, Research Policy 35 (2006) 394-411.
De Menech, M., et al., “Transition from squeezing to dripping in a microfluidic T-shaped junction”, Fluid Mech. (2008), vol. 595, pp. 141-161.
Fu, Taotao, et al., “Bubble formation and breakup dynamics in microfluidic devices: A review”, Chemical Engineering Science, http: //dx.doi.org/10.1016/j.ces.2015.02.016.
Fu, Taotao, et al., “Bubble formation and breakup dynamics in microfluidic devices: A review”, Chemical Engineering Science, http: //dx.doi.org/10.1016/j.ces.2015.02.016, 2015, 98 pages.
Fu, Taotao, et al., “Bubble formation and breakup mechanism in amicrofluidic flow-focusing device”, Chemical Engineering Science 64 (2009) 2392-2400.
Fu, Taotao, et al., “Squeezing-to-dripping transition for bubble formation in a microfluidic T-junction”, Chemical Engineering Science 65 (2010) 3739-3748.
Fujiwara, A., et al., “Bubble Breakup Phenomena in a Venturi Tube”, Proceedings of FEDSM2007, 5th Joint ASME/JSME Fluids Engineering Conference, Jul. 2007, 8 pages.
Garstecki, Piotr, et al., “Formation of droplets and bubbles in a microfluidic T-junction-scaling and mechanism of break-up”, Lab Chip, 6, 437-446, Jan. 25, 2006.
Gunduz, Oguzhan, et al., “Continuous Generation of Ethyl Cellulose Drug Delivery Nanocarriers from Microbubbles”, Pharm Res (2013) 30:225-237.
Gupta, Babita, et al., “Investigation of air-water two phase flow through a venturi”, Experimental Thermal and Fluid Science (2015), doi: http://dx.doi.org/10.1016/j.expthermflusci.2015.07.012.
Hettiarachchi, Kanaka, et al., “Venturi-Based Two-Layer Microfluidic Pumping System”, Twelfth International Conference on Miniaturized Systems for Chemistry and Life Sciences, Oct. 2008, 101-103.
Ikeura, H., et al., “Removal of residual pesticide, fenitrothion, in vegetables by using ozone microbubbles generated by different methods”, Journal of Food Engineering 103 (2011) 345-349.
Kawahara, A., et al., “Investigation of two-phase flow pattern, void fraction and pressure drop in a microchannel”, International Journal of Multiphase Flow 28 (2002) 1411-1435.
Khuntia, Snigdha, et al., “Microbubble-aided water and wastewater purification: a review”, Rev Chem Eng 2012, 31 pages.
Kurup, Nalini, et al., “Microbubbles: a Novel Delivery System”, JPRHC, vol. 2, Issue 3, 228-234.
Lee, Chang Hun, et al., “Experimental investigation of microbubble generation in the venturi nozzle”, International Journal of Heat and Mass Transfer 136 (2019) 1127-1138.
Lee, Jessamine Ng, et al., “Solvent Compatibility of Poly(dimethylsiloxane)-Based Microfluidic Devices”, Anal. Chem. 2003, 75, 6544-6554.
Li, Huai Z, et al., “Bubble formation and breakup mechanism in a microfluidic flow-focusing device”.
Li, Huai, et al., “Bubble formation and breakup mechanism in a microfluidic flow-focusing device”, Chemical Engineering Science 64 (2009) 2392-2400.
Li, Xiaobing, et al., “Cyclonic state micro-bubble flotation column in oil-in-water emulsion separation”, Separation and Purification Technology (2016), doi: http://dx.doi.org/10.1016/i.seppur.2016.01.021.
Li, Pan, et al., “Oxidation of Dimethyl Sulfoxide in Aqueous Solution Using Microbubbles”, Ind. Eng. Chem. Res. 2009, 48, 8048-8053.
Li, Mingda, et al., “Study of Venturi tube geometry on the hydrodynamic cavitation for the generation of microbubblesStudy of Venturi tube geometry on the hydrodynamic cavitation for the generation of microbubblesStudy of Venturi tube geometry on the

(56) References Cited

OTHER PUBLICATIONS hydrodynamic cavitation fo", https://www.sciencedirect.com/science/article/pii/60892687518304746, 37 pages.
Li, Pan, et al., "Water Treatment by Induced Air Flotation Using Microbubbles", Journal of Chemical Engineering of Japan, vol. 39, No. 8, pp. 896-903, 2006.
Liu, Qingming, et al., "Numerical study of bubbles rising and merging during convective boiling in micro-channels", Applied Thermal Engineering (2016), http://dx.doi.org/doi:10.1016/j.applthermaleng.2016.01.116.
Ma, Kun, et al., "Wettability control and patterning of PDMS using UV-ozone and water immersion", Journal of Colloid and Interface Science 363 (2011) 371-378.
Marmottant, Philippe, et al., "A bubble-driven microfluidic transport element for bioengineering", PNAS, Jun. 29, 2004, vol. 101, No. 26, 9523-9527.
Mcdonald, J. Cooper, et al., "Fabrication of a Configurable, Single-Use Microfluidic Device", Analytical Chemistry, vol. 73, No. 23, Dec. 1, 2001, 5645-5650.
Mcdonald, J. Cooper, et al., "Poly(dimethylsiloxane) as a Material for Fabricating Microfluidic Devices", vol. 35, No. 7, 2002, Accounts of Chemical Research, 491-499.
Mishra, Chandan, et al., "An experimental investigation of hydrodynamic cavitation in micro-Venturis", Physics of Fluids 18, 103603, Oct. 2006, 103603-1-103603-5.
Parmar, Rajeev, et al., "Microbubble generation and microbubble-aided transport process intensification—A state-of-the-art report", Chemical Engineering and Processing 64 (2013) 79-97.
Rebrov, E. V., "Two-Phase Flow Regimes in Microchannels", Theoretical Foundations of Chemical Engineering, 2010, vol. 44, No. 4, pp. 355-367.
Sadatomi, Michio, et al., "Micro-bubble generation rate and bubble dissolution rate into water by a simple multi-fluid mixer with orifice and porous tube", Experimental Thermal and Fluid Science 41 (2012) 23-30.
Sadatomi, M., et al., "Performance of a new micro-bubble generator with a spherical body in a flowing water tube", Experimental Thermal and Fluid Science 29 (2005) 615-623.
Scharnweber, Tim, et al., "Rapid prototyping of microstructures in polydimethylsiloxane (PDMS) by direct UV-lithography", Lab Chip, 2011, 11, 1368-1371.
Serizawa, Akimi, et al., "Two-phase flow in microchannels", Experimental Thermal and Fluid Science 26 (2002) 703-714.
Shatat, Mohammed M.E., et al., "Drag Reduction Effects of Micro-Bubble in Straight and Helical Pipes", Journal of Fluid Science and Technology, vol. 4, No. 1, 2009, 156-167.
Shin, Won-Tae, et al., "Ozonation using microbubbles formed by electric fields", Separation and Purification Technology 15 (1999) 271-282.
Sollier, Elodie, et al., "Rapid prototyping polymers for microfluidic devices and high pressure injections", Lab Chip, 2011, 11, 3752.
Steegmans, M.L.J., et al., "Generalised insightsindropletformationatT-junctionsthroughstatisticalanalysis", Chemical Engineering Science 64 (2009) 3042-3050
Tabei, Katsuine, et al., "Study of Micro Bubble Generation by Swirl Jet", Journal of Environment and Engineering, vol. 2, No. 1, 2007, 172-182.
Tasaki, Tsutomu, et al., "Degradation of methyl orange using short-wavelength UV irradiation with oxygen microbubbles", Journal of Hazardous Materials 162 (2009) 1103-1110.
Temesgena, Tatek, et al., "Micro and nanobubble technologies as a new horizon for water-treatment techniques: A review", Advances in Colloid and Interface Science (2017), doi: 10.1016/j.cis.2017.06.011.
Terasaka, Koichi, et al., "Removal of Iron Oxide Fine Particles from Waste Using Microbubble Flotation", 2008, 43-50.
Terasaka, Koichi, et al., "Separation of Fine Particle Suspended in Water Microbubble Flotation".
Thorsen, Todd, et al., "Dynamic Pattern Formation in a Vesicle-Generating Microfluidic Device", The American Physical Society, vol. 86, No. 18, Apr. 30, 2001, 4163-4166.
Tsuge, Hideki, "Formation and Analysis of Microbubbles", Micro-and Nanobubbles: Fundamentals and Applications, Chapter 2, 12-83.
Unger, Evan C., et al., "Therapeutic applications of lipid-coated microbubbles", Advanced Drug Delivery Reviews 56 (2004) 1291-1314.
Van Steijn, Volkert, et al., "u-PIV study of the formation of segmented flow in microfluidic T-junctions", Chemical Engineering Science 62 (2007) 7505-7514.
Walker, Angela B., et al., "Ozonation of Soluble Organics in Aqueous Solutions Using Microbubbles", Ozone: Science & Engineering: The Journal of the International Ozone Association, 23:1, 77-87, DOI: 10.1080/01919510108961990, 2001.
Xu, J. H., et al., "Formation of Monodisperse Microbubbles in a Microfluidic Device", AlChE Journal, vol. 52, No. 6, Jun. 2006, 2254-2259.
Yin, Junlian, et al., "Experimental study on the bubble generation characteristics for an venturi type bubble generator", International Journal of Heat and Mass Transfer 91 (2015) 218-224.
Yoshida, Akira, et al., "Water Purification Using the Adsorption Characteristics of Microbubbles", Japanese Journal of Applied Physics, vol. 47, No. 8, Aug. 8, 2008, pp. 6574-6577.
Zhao, Liang, et al., "A visualized study of the motion of individual bubbles in a venturitype bubble generator", Progress in Nuclear Energy 97 (2017) 74e89.
Zhao, Liang, et al., "Effects of the divergent angle on bubble transportation in a rectangular Venturi channel and its performance in producing fine bubbles", International Journal of Multiphase Flow 114 (2019) 192-206.
Zhao, L., et al., "Gas-Liquid Flow Patterns At Microgravity Conditions", Int. J. Multiphase Flow vol. 19, No. 5, pp. 751-763, 1993.
Li, Mingda, et al., "Study of Venturi tube geometry on the hydrodynamic cavitation for the generation of microbubblesStudy of Venturi tube geometry on the hydrodynamic cavitation for the generation of microbubblesStudy of Venturi tube geometry on the hydrodynamic cavitation fo", https://www.sciencedirect.com/science/article/pii/S0892687518304746, 37 pages.

* cited by examiner

Schematic of micro-fluidic setup

Model 1

Model 2

MONODISPERSED MICROBUBBLES PRODUCTION USING A MODIFIED MICRO-VENTURI BUBBLE GENERATOR

BACKGROUND

Microbubbles have great potential in a wide range of applications, including without limitation, water treatment, oil separation, drug delivery, microparticle transfer, and chemical processes. Conventional microbubbles are generated using techniques that involve complex machinery or chemical reactions. These techniques are unpredictable and complex. In addition, it remains an ongoing challenge to controllably produce monodisperse microbubbles of a given size and/or at a desired frequency. It has also been recognized in the art that the flow behavior of fluids in microchannels is unconventional when compared to macroscale behavior; bubbles or droplets rarely coalesce with each other in such cases. Accordingly, macroscale techniques cannot be applied to microscale techniques to produce microbubbles.

SUMMARY OF THE INVENTION

According to some aspects of the invention, a microfluidic device for producing at least one of monodisperse microbubbles, monodisperse micro-droplets, and monodisperse micro-emulsions may include a first microfluidic channel for supplying a continuous phase fluid, the first microfluidic channel including a convergent section and a constant-width section downstream from the convergent section, wherein the constant-width section discharges into a junction; a second microfluidic channel for supplying a dispersed phase fluid, the second microfluidic channel including an orthogonal section oriented orthogonal to the constant-width section, wherein the orthogonal section discharges into the junction; and a third microfluidic channel for conveying produced microbubbles, the third microfluidic channel including a divergent section, wherein the junction discharges into the divergent section.

According to further aspects of the invention, a method of producing monodisperse microbubbles may include providing a microfluidic device including a first microfluidic channel including a convergent section and a constant-width section downstream from the convergent section, a second microfluidic channel including an orthogonal section oriented orthogonal to the constant-width section, and a third microfluidic channel including a divergent section, wherein the constant-width section and the orthogonal section discharge into a junction and wherein the junction discharges into the divergent section; supplying a flow of a continuous phase fluid through at least the convergent section and the constant-width section of the first microfluidic channel into the junction; and supplying a flow of a dispersed phase fluid through at least the orthogonal section of the second microfluidic channel into the junction; wherein the continuous phase fluid and the dispersed phase fluid are contacted in the junction where said fluids undergo a shear force and a decrease in pressure to form one or more monodisperse microbubbles.

DETAILED DESCRIPTION

Figure 1:
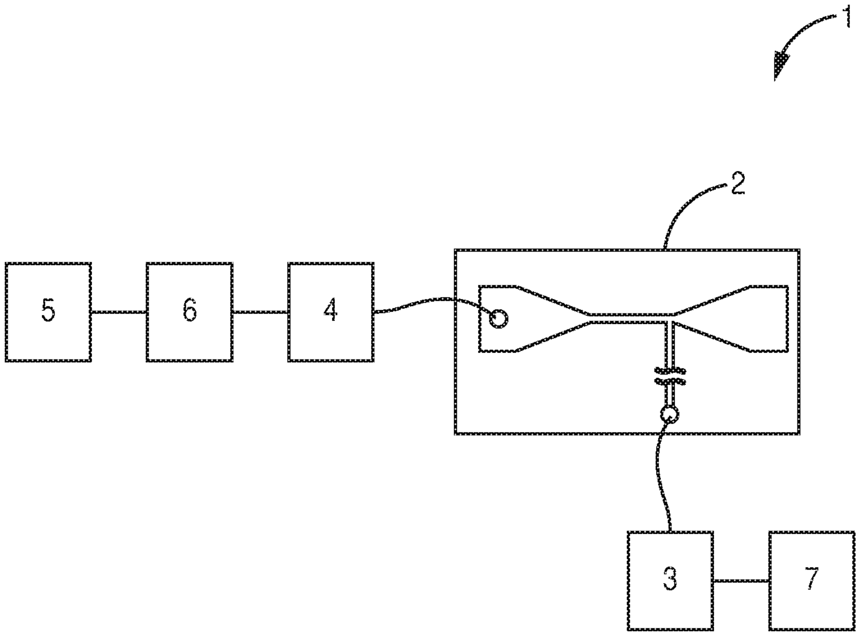
FIG. 1 is a schematic diagram of a system for producing microbubbles, according to one or more embodiments of the invention.

The present invention provides microfluidic devices and related methods for controllably producing at least one of monodisperse microbubbles, monodisperse micro-droplets, and monodisperse micro-emulsions, among other things. This invention of the present disclosure has a wide range of industrial application. For example, microbubbles generated according to the microfluidic devices and methods disclosed herein have important role in agricultural engineering applications, such as for example fermentation of soil, use in hydrophobic plant growth, improvement of the aquaculture productivity, and the like. In medical applications, microbubbles of the present disclosure may optionally be encapsulated and, either the encapsulated or not encapsulated forms of the microbubbles may be used for diagnostic imaging and therapeutic applications. In pharmaceutical industry, microbubbles of the present disclosure may be used for carrying drugs or genes to any specific tissue. In biosensing applications, the optical characteristics of the microbubbles of the present disclosure, based on their hollow microstructure, may be used to study biomolecules. These are provided as examples of the myriad applications in which the invention may be implemented and thus shall not be limiting.

The microfluidic devices may include a modified micro-Venturi channel for producing microbubbles, micro-droplets, and/or micro-emulsions. Microbubbles may include a gas bubble dispersed in a liquid medium having a diameter of about 100 μm or less. Microbubbles (as well as micro-droplets and/or micro-emulsions) that are uniform or substantially uniform in size may be referred to as monodisperse microbubbles. Monodisperse microbubbles may be generated by mixing gas and liquid at the throat of the modified micro-Venturi channel. The microfluidic devices and methods disclosed herein include a geometrical modification that changes the fundamental physics of the breakup mechanism to obtain monodisperse microbubbles. At least one advantage of the present invention is that the microfluidic devices disclosed herein permit operational control over the production of microbubbles by varying one or more of pressure, flow rate conditions, and other parameters. In addition, monodisperse microbubbles may be controllably produced with a specified diameter and/or a specified frequency, among other properties. While not wishing to be bound to a theory and according to some embodiments, the microfluidic device of the present disclosure may utilize a pressure drop across a merging air bubble and applied shear forces (e.g., and/or shear stresses), which squeeze the microbubbles, at a specific location inside the modified micro-Venturi channel to controllably produce monodispersed air microbubbles. For example, there may be regions within the modified micro-Venturi channel in which the pressure drop decreases while the velocity remains high. This combination may be applied to generate and manipulate monodispersed microbubbles and its properties. For example, by controlling air and water flow rates, both size and frequency of microbubbles can be controlled.

FIG. 1 is a schematic diagram of a system for producing microbubbles (e.g., at least one of monodisperse microbubbles, monodisperse micro-droplets, and monodisperse micro-emulsions), according to one or more embodiments of the invention. As shown in FIG. 1, the system 1 for producing microbubbles may include a microfluidic device 2, a source of a dispersed phase fluid 3, and a source of a continuous phase fluid 4. The source of a dispersed phase fluid 3 and the source of a continuous phase fluid 4 may have non-adjacent inlets and may be in fluid communication with the microfluidic device 2 through separate inlets. The system may optionally further include a computer 5 and a mass flow controller 6 coupled to the source of the continuous phase fluid 4. Using the computer 5, the mass flow controller 6 may be used to control the mass flow rate of the continuous phase fluid from the source 4 to the microfluidic device 2. The mass flow controller is not particularly limited and may include, for example and without limitation, an air compressor, an air filter, a pressure regulator, and one or more reservoirs for storing the continuous phase fluid. The syringe pump 7 may be used to control the flow rate of the dispersed phase fluid from the source 3 to the microfluidic device 2. Examples of pumps suitable for use herein include one or more of syringe pumps and pressure pumps, either of which may be used for either or both fluids. Other devices for supplying the continuous phase fluid and/or dispersed phase fluid may be utilized herein without departing from the scope of the present disclosure.

Figure 2A:
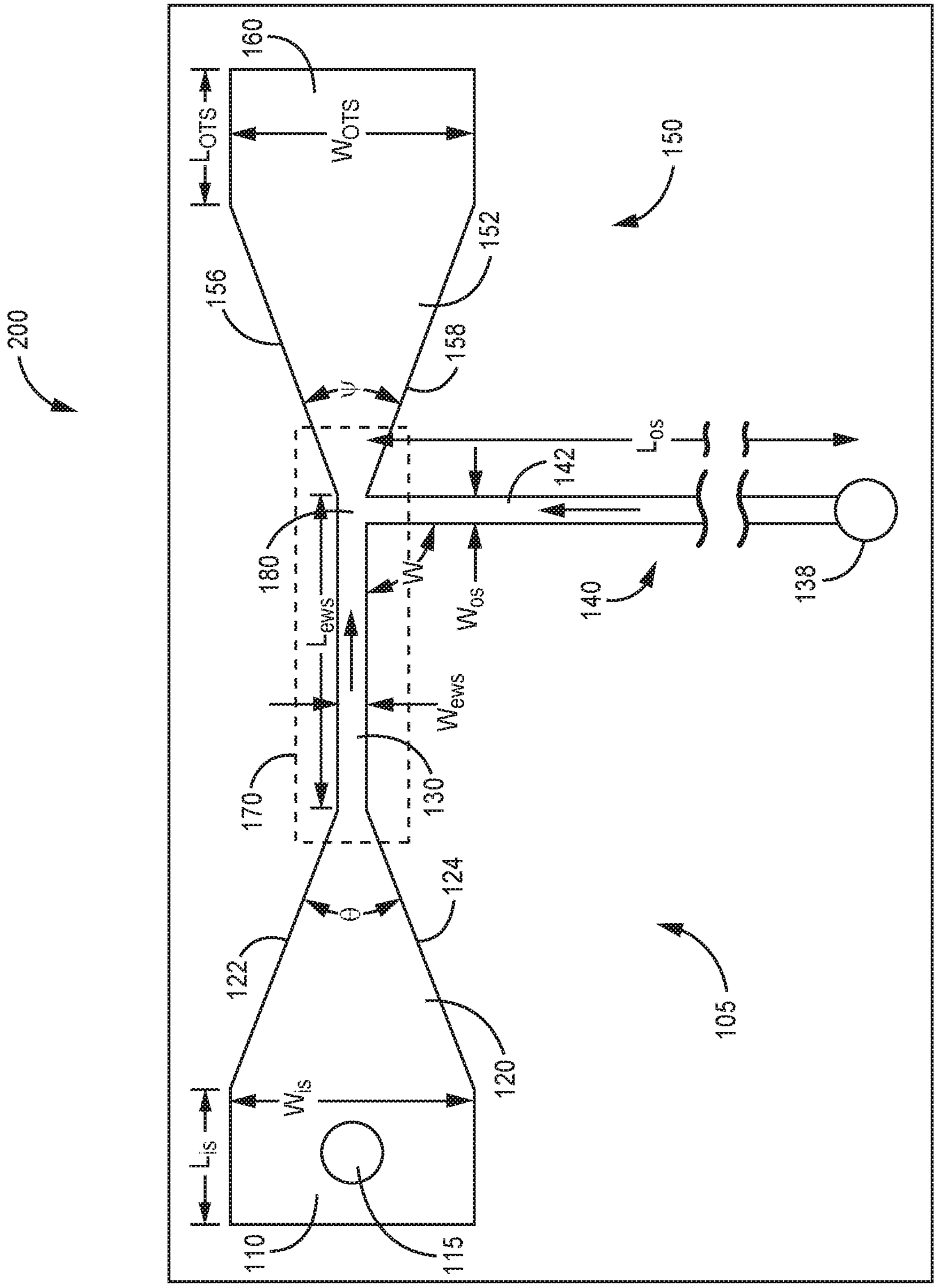
FIG. 2A is a schematic top view of a microfluidic device, according to one or more embodiments of the invention.
Figure 2B:
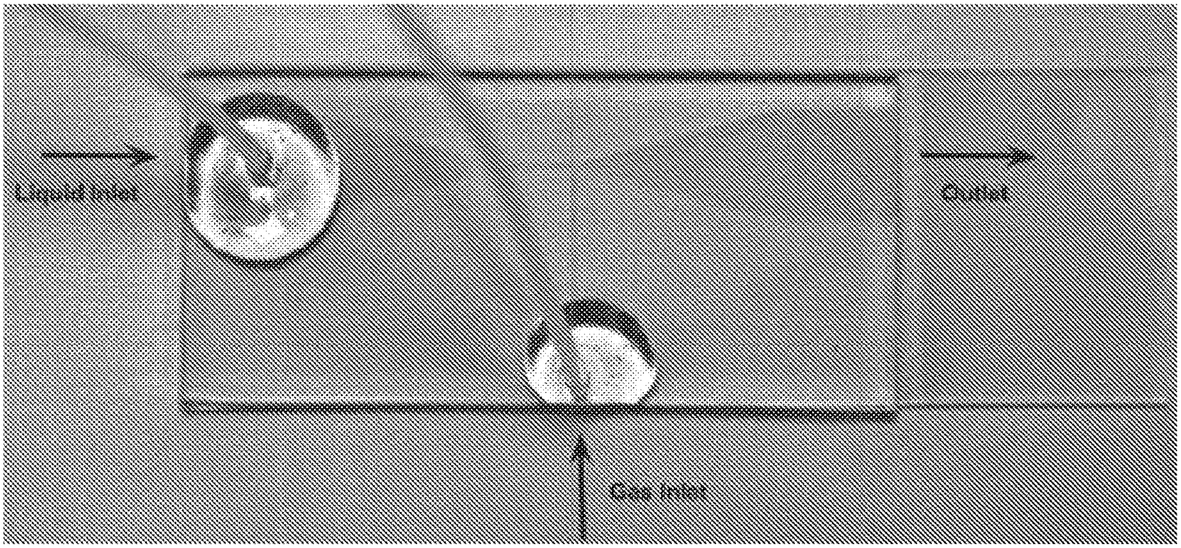
FIG. 2B is an image of a microfluidic device, according to one or more embodiments of the invention.
Figure 3:
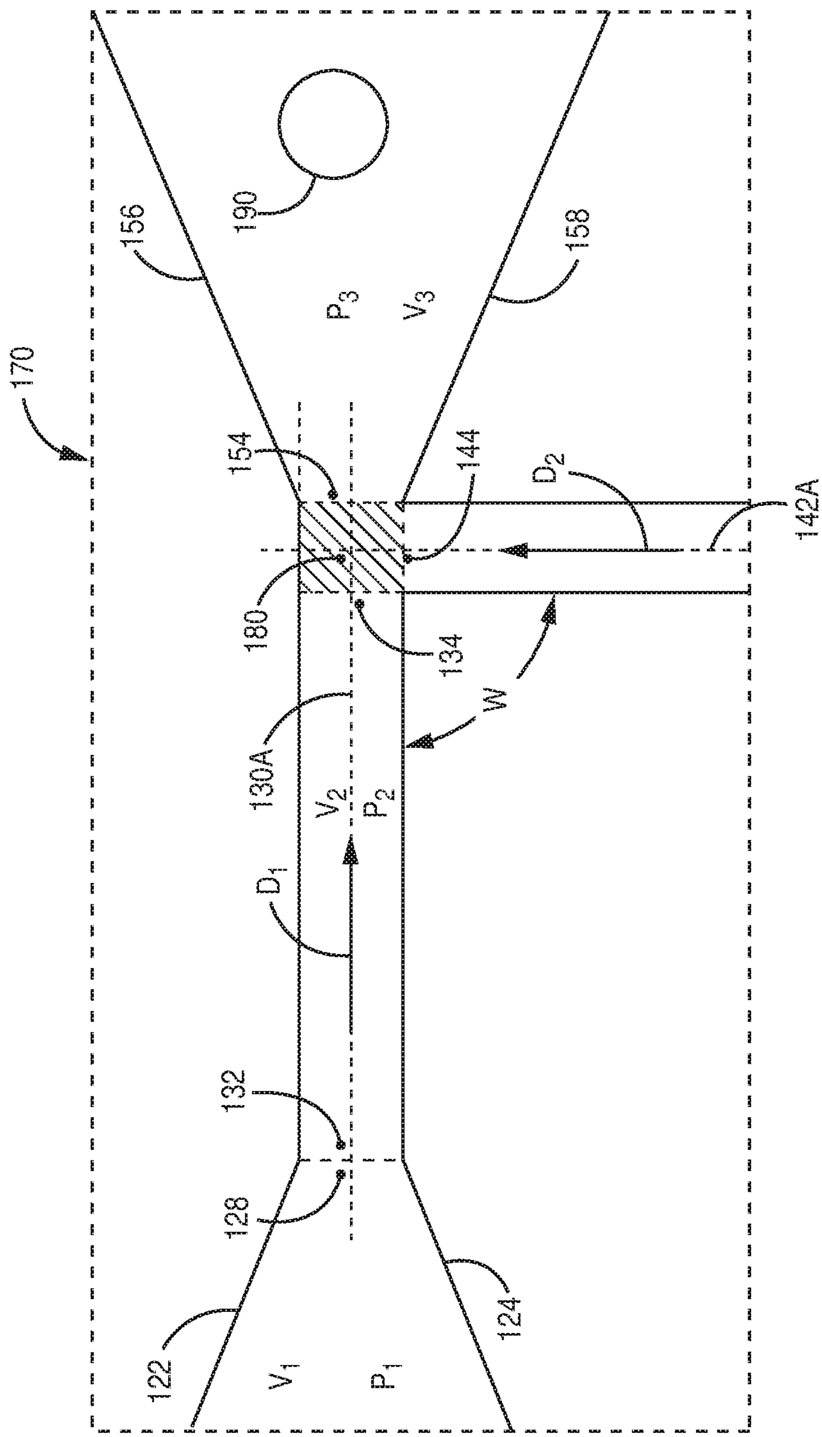
FIG. 3 is a schematic enlarged top view of the microfluidic device shown in FIG. 2A, according to one or more embodiments of the invention.

Referring now to FIG. 2A and FIG. 3, schematic top views of a microfluidic device for producing at least one of monodisperse microbubbles, monodisperse micro-droplets, and monodisperse micro-emulsions are illustrated, according to one or more embodiments of the invention. As shown in FIG. 2A and FIG. 3, the microfluidic device 200 may include a first microfluidic channel 105, a second microfluidic channel 140, and a third microfluidic channel 150. The first microfluidic channel 105 may include an inlet section 110, a convergent section 120, and a constant-width section 130. The second microfluidic channel 140 may include at least an inlet section 138 and an orthogonal section 142. In embodiments, the second microfluidic channel 140 and, in particular, the orthogonal section 142 is located at the end of the first microfluidic channel 105 and at the beginning of the third microfluidic channel 150. The third microfluidic channel 150 may include a divergent section 152 and an outlet 160. A junction 180 may be defined by, and located at an intersection of, the first microfluidic channel 105, the second microfluidic channel 140, and the third microfluidic channel 150. An image of a microfluid device of the present disclosure is presented in FIG. 2B, according to one or more embodiments of the invention.

In some embodiments, the first microfluidic channel 105 is a continuous phase fluid supply channel in fluid communication with a source of the continuous phase fluid 4 via a first fluid supply inlet 115. The first microfluidic channel 105 may extend from the inlet section 110, which may be fluidly connected to the first fluid supply inlet 115, to the constant-width section 130 which may discharge the continuous phase fluid into the junction 180. The convergent section 120 may be located between and adjacent to the inlet section 110 and the constant-width section 130, with the inlet section 110 located upstream from the convergent section 120 and the constant-width section located downstream from the convergent section 120. Sidewalls 122 and 124 of the convergent section 120 may converge at a convergent angle θ from the inlet section 110 to the constant-width section 130 which, having a constant width dimension, may be a straight or substantially straight channel. As will be discussed in more detail below, the convergent section 120 and the constant-width section 130 may form a micro-Venturi channel with the divergent section 152 of the third microfluidic channel 150.

In some embodiments, the second microfluidic channel 140 is a dispersed phase fluid supply channel in fluid communication with a source of the dispersed phase fluid 3 via the second fluid supply inlet 138. The second microfluidic channel 140 may extend from the inlet section 136 (not shown), which may be fluidly connected to the second fluid supply inlet 138, to the orthogonal section 142 which may discharge the dispersed phase fluid into the junction 180. In some embodiments, the second microfluidic channel 140 includes one or more other sections in addition to the inlet section 136 and the orthogonal section 142. While the inlet section 136 and said other sections of the second microfluid channel are permitted to have non-orthogonal orientations, in some embodiments, the orthogonal section 142 is orthogonal and adjacent to the constant-width section 130 of the first microfluidic channel 105. The orthogonal section 142 and constant-width section 130 may form an angle W, which is about 90 degrees in an orthogonal orientation. In other embodiments, the orthogonal section 142 may be positioned at an angle W other than 90 degrees, in which case the orthogonal section 142 may be referred to as a nonorthogonal section 142.

In some embodiments, the third microfluidic channel 150 is a microbubble conveying channel in fluid communication with the first microfluidic channel 105 and the second microfluidic channel 140. More specifically, in some embodiments, the divergent section 152 of the third microfluidic channel 150 may be in fluid communication with both the constant-width section 130 of the first microfluidic channel 105 and the orthogonal section 142 of the second microfluidic channel 140 via the junction 180. For example, the junction 180 may discharge into the divergent section 152. The divergent section 152 may be located between and adjacent to the junction 180 and the outlet section 160, with the junction 180 located upstream from the divergent section 152 and the outlet section 160 located downstream from the divergent section. Sidewalls 156 and 158 of the divergent section 152 may diverge at a divergent angle ψ from the junction 180 to the outlet section 160.

In some embodiments, the junction 180 is where the continuous phase fluid flowing through the first microfluidic channel 105 and the dispersed phase fluid flowing through the second microfluidic channel 140 are contacted and/or intersect. For example, in some embodiments, the junction 180 may be located where the first microfluidic channel 105 and the second microfluidic channel 140 intersect. In certain embodiments, the junction 180 may be located where the constant-width section 130 of the first microfluidic channel 105 and the orthogonal section 142 of the second microfluidic channel 140 intersect. In other words, the constant-width section 130 and the orthogonal section 142 may discharge into the junction 180 through outlets 134 and 144, respectively. The intersection of the first microfluidic channel 105 and the second microfluidic channel 140 may be provided anywhere along the length of the constant-width section 130 (see comment). In some embodiments, the junction 180 is located at a distal end of the constant-width section 130. For example, the junction 180 may be located immediately upstream from and adjacent to the divergent section 152 of the third microfluidic channel 150. Microbubbles, which may be monodisperse, may be formed in the junction 180 or at least may begin to form in the junction 180. For example, in some embodiments, microbubbles are formed in the junction 180 and proceed to the divergent section 152 where said microbubbles are conveyed to the outlet section 160. In some embodiments, the microbubbles begin to form in the junction 180 and are fully formed in the divergent section 152 which also conveys said microbubbles to the outlet section 160.

In some embodiments, the convergent section 120 of the first microfluidic channel 105, the constant-width section 130 of the first microfluidic channel 105, the divergent section 152 of the third microfluidic channel 150, and the orthogonal section 142 of the second microfluidic channel 140 may collectively form what is referred to herein as a modified micro-Venturi channel. The modified micro-Venturi channel may include features that impart applied shear forces upon the dispersed phase fluid (e.g., and optionally upon the continuous phase fluid) and that induce a pressure drop across the modified micro-Venturi channel, both at a specific location, to controllably produce monodisperse microbubbles.

The dimensions of the first microfluidic channel, the second microfluidic channel, and the third microfluidic channel may vary across a wide range of lengths, widths, and/or depths. In some embodiments, the first microfluidic channel 105, the second microfluidic channel 140, and the third microfluidic channel 150 may be microchannels, each independently having a hydraulic diameter of about 1 mm or less. In some embodiments, the depth of the first microfluidic channel 105, the second microfluidic channel 140, and the third microfluidic channel may range from 10 μm to about 100 μm. In the illustrated embodiments depicted in FIGS. 2A and 3, the depth of the first microfluidic channel 105, the second microfluidic channel 140, and the third microfluidic channel 150 is about 40 μm, according to some embodiments. In one or more other embodiments, the depth of one or more of said microchannels may be about 30 μm, about 40 μm, about 50 μm, about 60 μm, about 70 μm, about 80 μm, or generally any depth between 10 μm and 100 μm. In some embodiments, the depth of the first microfluidic channel, the second microfluidic channel, and the third microfluidic channel is about 40 μm. Other dimensions of the first microfluidic channel 105, the second microfluidic channel 140, and the third microfluidic channel 150 may vary and/or may be the same. For example, one or more of said channels 105, 140, and 150 may have the same or a different length dimension, width dimension, and/or cross-sectional shape (e.g., square-shaped, rectangular-shaped, polygonal shaped, and the like). The length and width dimensions may range from about 0.01 mm to about 100 mm.

In the illustrated embodiment depicted in FIG. 2A, the inlet section 110 may have a length $L_{IS}$ and a width $W_{IS}$, the constant-width section 130 may have a length $L_{EWS}$ and a width $W_{EWS}$, the outlet section 160 may have a length $L_{OTS}$ and a width $W_{OTS}$, the orthogonal section 142 may have a length $L_{OS}$ and a width $W_{OS}$, the convergent section may have a convergent angle θ, and the divergent section may have a divergent angle ψ. Any of the lengths and/or widths and/or angles disclosed herein may be taken as ratios (e.g., one or more of lengths $L_{IS}$, $L_{EWS}$, $L_{OTS}$, and $L_{OS}$ may be taken as ratios to each other or as ratios to the aforementioned widths). The lengths $L_{IS}$, $L_{EWS}$, $L_{OTS}$, and $L_{OS}$ may independently vary from about 0.01 mm to about 1000 mm, optionally provided that the other dimensions of the section of the microfluidic channel are such that the hydraulic diameter of that section is about 1 mm or less. Similarly, the widths $W_{IS}$, $W_{EWS}$, $W_{OTS}$, and $W_{OS}$ may independently vary from about 0.01 mm to about 1000 mm, optionally provided that the other dimensions of the section of the microfluidic channel are such that the hydraulic diameter of that section is about 1 mm or less. The convergent angle θ may include any angle less than 180 degrees. The divergent angle ψ may include any angle less than 180 degrees.

The lengths and widths of the inlet section 110 and the outlet section 160 are not particularly limited. In some embodiments, for example, the lengths and widths of the inlet section 110 and the outlet section 160 may be dependent upon the convergent angle and divergent angle being employed. In some embodiments, the lengths and widths of the inlet section 110 and the outlet section 160 may be dependent on the type and/or dimensions of the fluid supply inlets 115 and/or 138. In some embodiments, the length $L_{IS}$ and the length $L_{OTS}$ are independently about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm, or any incremental value or subrange between about 0.01 mm and about 20 mm. In some embodiments, the width $W_{IS}$ and the width $W_{OTS}$ are independently about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm, or any incremental value or subrange between about 0.01 mm and about 20 mm. In some embodiments, $L_{IS}$ is about 4 mm, $L_{OS}$ is about 10 mm, $W_{IS}$ is about 8.5 mm, and $W_{OS}$ is about 4.8 mm. In some embodiments, ratios of one or more of these dimensions may be used to scale up or scale down the inlet section 110 and the outlet section 160.

The lengths and widths of the constant-width section 130 and the orthogonal section 142 may be varied. The width $W_{EWS}$ and width $W_{OS}$ may be the same or different. In some embodiments, the $W_{EWS}$ and the width $W_{OS}$ are independently about 0.01 mm, about 0.10 mm, about 0.15 mm, about 0.20 mm, about 0.25 mm, about 0.30 mm, about 0.35 mm, about 0.40 mm, about 0.45 mm, about 0.50 mm, about 0.55 mm, about 0.60 mm, about 0.65 mm, about 0.70 mm, about 0.75 mm, about 0.80 mm, about 0.85 mm, about 0.90 mm, about 0.95 mm, about 1 mm, or any incremental value or subrange between 0.01 mm and about 1 mm. In some embodiments, the width $W_{EWS}$ and the width $W_{OS}$ are the same and about 0.23 mm. Similarly, the length $L_{EWS}$ and the length $L_{OS}$ may be the same or different. In some embodiments, the length $L_{EWS}$ and the length $L_{OS}$ are independently about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 10.5 mm, about 11 mm, about 11.5 mm, about 12 mm, about 12.5 mm, about 13 mm, about 13.5 mm, about 14 mm, about 14.5 mm, about 15 mm, or any incremental value or subrange between about 1 mm and about 15 mm. In some embodiments, the length $L_{EWS}$ is about 6 mm. In some embodiments, the ratio(s) of one or more of the width $W_{EWS}$, the width $W_{OS}$, the length $L_{EWS}$, and the $L_{OS}$ may be used to scale up or scale down the constant-width section 130 and/or orthogonal section 142.

The convergent angle θ and the divergent angle ψ may be varied. In some embodiments, the convergent angle θ and the divergent angle ψ are the same. For example, in some embodiments, the convergent angle θ and the divergent angle ψ have the same angles and range from about 15 degrees to about 45 degrees, about 20 degrees to about 40 degrees, about 25 degrees to about 35 degrees, about 28 degrees to about 32 degrees, or any incremental value or subrange between that range. For example, in some embodiments, the convergent angle θ and the divergent angle ψ are the same and about 30 degrees. In other embodiments, the convergent angle θ and the divergent angle ψ are different. In some embodiments, the lengths and widths of the constant-width section 130 and the orthogonal section 142, and optionally one or more of the convergent angle θ and the divergent angle ψ, may be optimized for the production of monodisperse microbubbles.

In certain embodiments, the inlet section 110 may have a length $L_{IS}$ of about 4 mm and a width $W_{IS}$ of about 8.5 mm, the constant-width section 130 may have a length $L_{EWS}$ of about 6 mm and a width $W_{EWS}$ of about 0.23 mm, the outlet section 160 may have a length $L_{OTS}$ of about 10 mm and a width $W_{OTS}$ of about 4.8 mm, the orthogonal section 142 may have a width $W_{OS}$ of about 0.23 mm and a length $L_{OS}$ of about 10 mm, the convergent section may have a convergent angle θ of about 30 degrees, and the divergent section may have a divergent angle ψ of about 30 degrees. In certain embodiments, the depth may be about 40 μm. In certain embodiments, the length of the microfluidic device (not shown) may be about 52 mm.

Referring now to FIG. 3, a modified micro-Venturi channel is illustrated in accordance with one or more embodiments of the invention. In the illustrated embodiment of FIG. 3, a continuous phase fluid having a velocity $v_1$ and a pressure $p_1$ may flow in a direction $D_1$ through an outlet 128 of the convergent section 120 to an inlet 132 of the constant-width section 130. The continuous phase fluid having a velocity $v_2$ and a pressure $p_2$ may flow from the inlet 132 to an outlet 134 which discharges into the junction 180. A dispersed phase fluid having a velocity $v_4$ and a pressure $p_4$ may flow in direction $D_2$ to an outlet 144 of orthogonal section 142 which discharges into the junction 180, where the dispersed phase fluid and the continuous phase fluid are combined. The combined fluids, either with fully or at least partially formed monodisperse microbubbles, having a velocity $V_3$ and a pressure $p_3$ may flow from the junction 180 through an inlet 154 of the divergent section 152 to the outlet section 160. In some embodiments, to achieve the requisite applied shear force (and/or shear stress) and the pressure drop across the modified micro-Venturi channel suitable for producing monodisperse microbubbles, the fluid flow is characterized by one or more of $v_2>v_1$ and $p_3<p_1$. In some embodiments, monodisperse microbubbles are produced by a combination of a pressure drop across a first microfluidic channel to a third microfluidic channel and an increase in velocity in the constant width section of the first microfluidic channel. In some embodiments, the amount and/or number of microbubbles (e.g., monodisperse microbubbles) may be increased by increasing one or more of flowrates of working fluids and designing multiple micro-Venturi channels in parallel.

In some embodiments, the microfluidic devices and related methods may controllably produce monodispersed microbubbles (e.g., of air) using a modified micro-Venturi channel. In some embodiments, the working fluids may include water as a continuous phase fluid and air as a dispersed phase fluid. The influence of flow control parameters, such as water pressure and air flow rate, on the controlled generation of microbubbles was evaluated using a transparent modified micro-Venturi channel having a depth of about 40 μm. In some embodiments, air bubbles may be generated in an optionally transparent modified micro-Venturi channel based on a cross flow rupture technique in combination with a pressure drop across the modified micro-Venturi channel. The modified micro-Venturi channel may optimally produce monodisperse microbubbles. The geometry of generated microbubbles may undergo a sudden change in shape, from an ellipsoidal shape to a circular shape with a constant diameter within or proximal to a vena contracta region. The velocity and size of the microbubbles may be strongly dependent on the flow control parameters (e.g., flow rate of air). Bubble frequency may increase linearly with air mass flow rates. For example, the velocity of microbubbles generated in the vena contracta region may decrease suddenly to reach a constant value (e.g., a value of about 0.25 m/s). The bubble area may be measured, having a constant value in time even if its shape is changed. Bubble size may depend strongly on air mass flow rate. For different inlet flow parameters, the bubble frequency may increase linearly with respect to the increasing air mass flow rates.

Figure 4:
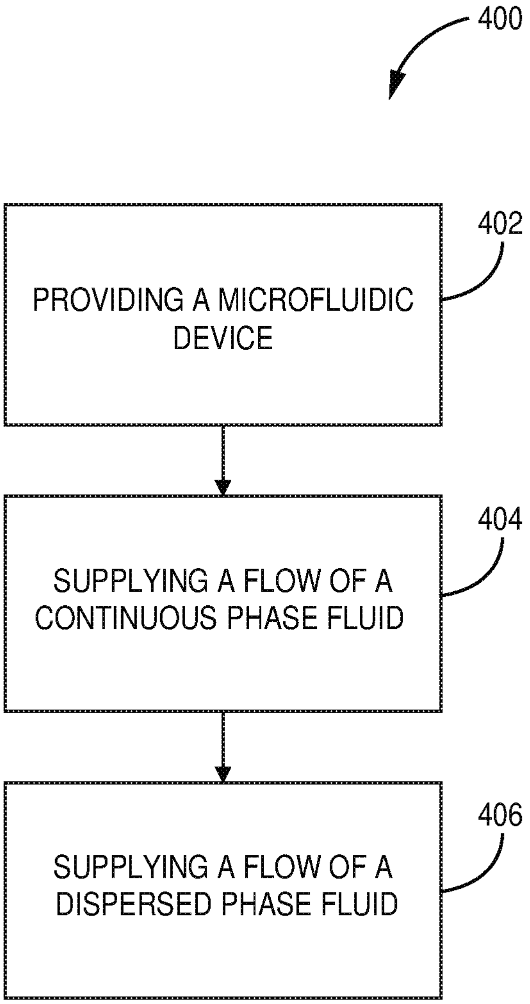
FIG. 4 is a flowchart of a method of producing microbubbles, according to one or more embodiments of the invention.

FIG. 4 is a flowchart of a method 400 of producing at least one of monodisperse microbubbles, monodisperse microdroplets, and monodisperse micro-emulsions, according to one or more embodiments of the invention. The method 400 may be performed at about room temperatures and/or ambient temperatures. For example, in some embodiments, the method may be performed at temperatures in the range of about 20 degrees C. to about 30 degrees C. In some embodiments, the method may be performed at about 21 degrees C.

As shown in FIG. 4, the method 400 may include one or more of the following steps: providing 402 a microfluidic device, the microfluidic device including a first microfluidic channel including a convergent section and a constant-width section downstream from the convergent section, a second microfluidic channel including an orthogonal section oriented orthogonal to the constant-width section, and a third microfluidic channel including a divergent section, wherein the constant-width section and the orthogonal section discharge into a junction and wherein the junction discharges into the divergent section; supplying 404 a flow of a continuous phase fluid through at least the divergent section and the constant-width section of the first microfluidic channel into the junction; and supplying 406 a flow of a dispersed phase fluid through at least the orthogonal section of the second microfluidic channel into the junction. In some embodiments, the continuous phase fluid and the dispersed phase fluid are contacted in the junction where said fluids undergo a shear force and a decrease in pressure to form one or more monodisperse microbubbles.

In step 402, the microfluidic device may include any of the microfluidic devices disclosed herein. For example, in some embodiments, the microfluidic device includes the microfluidic device 200. In some embodiments, the microfluidic device includes a first microfluidic channel including a convergent section and a constant-width section downstream from the convergent section, a second microfluidic channel including an orthogonal section oriented orthogonal to the constant-width section, and a third microfluidic channel including a divergent section, wherein the constant-width section and the orthogonal section discharge into a junction and wherein the junction discharges into the divergent section. Other variations are possible and thus these shall not be limiting.

In step 404, the continuous phase fluid may be supplied to the first microfluidic channel or more specifically to the divergent section and the constant-width section of the first microfluidic channel. In some embodiments, the continuous phase fluid includes water (e.g., deionized water). In some embodiments, the continuous phase fluid is supplied at constant fluid pressure (e.g., the fluid pressure is held constant). In other embodiments, the fluid pressure may vary. In some embodiments, the fluid pressure ranges from about 10 mbar to about 500 mbar, or any incremental value or subrange between that range. In some embodiments, the fluid pressure is about 40 mbar. In some embodiments, the fluid pressure is about 60 mbar. In some embodiments, the fluid pressure is about 80 mbar. In some embodiments, the fluid pressure is about 100 mbar. In some embodiments, the fluid pressure is between about 1 mbar and 40 mbar.

In step 406, the dispersed phase fluid may be supplied to the second microfluidic channel or more specifically to the orthogonal section of the second microfluidic channel. In some embodiments, the dispersed phase fluid includes air. In some embodiments, the dispersed phase fluid is supplied at a constant flow rate. In other embodiments, the dispersed phase fluid may be supplied at a variable flow rate. In some embodiments, the dispersed phase fluid is supplied at a flow rate in the range of about 0 $\mu l\ hr^{-1}$ to about 100,000 $\mu l\ hr^{-1}$, or any incremental value or subrange between that range. In some embodiments, the dispersed phase fluid is supplied at a flow rate of about 1000 $\mu l\ hr^{-1}$. In some embodiments, the dispersed phase fluid is supplied at a flow rate of about 2000 $\mu l\ hr^{-1}$. In some embodiments, the dispersed phase fluid is supplied at a flow rate of about 3000 $\mu l\ hr^{-1}$. In some embodiments, the dispersed phase fluid is supplied at a flow rate of about 4000 $\mu l\ hr^{-1}$. In some embodiments, the dispersed phase fluid is supplied at a flow rate of about 5000 $\mu l\ hr^{-1}$. In some embodiments, the dispersed phase fluid is supplied at a flow rate of about 6000 $\mu l\ hr^{-1}$. In some embodiments, the dispersed phase fluid is supplied at a flow rate of about 7000 $\mu l\ hr^{-1}$.

In some embodiments, flow control parameters may be varied, optimized, and/or tuned to control the production of microbubbles. For example, one or more of the fluid pressure of the continuous phase fluid, the volumetric flow rate of the dispersed phase fluid, fluid pressure of the dispersed phase fluid, the volumetric flow rate of the continuous phase fluid, may be varied to control the flow pattern of the microbubbles the microbubble area, the microbubble frequency, the shape of the microbubble, the size of the microbubble. In some embodiments, microbubble area increases as the volumetric flow rate of the dispersed phase fluid increases. In some embodiments, the frequency of microbubble production increases as the volumetric flow rate of air increases and/or as the pressure of the continuous phase fluid increases. In some embodiments, increasing or decreasing one or more of the pressure of the continuous phase fluid and the volumetric flow rate of the dispersed phase fluid changes the shape and/or size of the microbubbles. In some embodiments, the microbubble shape is circular (for model 2 see FIGS. 9E-9H). In some embodiments, the microbubble shape is ellipsoidal (for model 1 see FIGS. 9A-9D). In some embodiments, the microbubble diameter is about 110 μm or less. In some embodiments, the microbubbles which are produced are monodisperse and/or uniform (or substantially uniform) in size.

In some embodiments, each of the continuous phase and the dispersed phase independently includes one or more fluids. Examples of fluids include, without limitation, gases, liquids, and mixtures thereof. In some embodiments, the continuous phase includes at least one of one or more gases, one or more liquids, and a mixture of one or more gases and one or more liquids. In some embodiments, the dispersed phase includes at least one of one or more gases, one or more liquids, and a mixture of one or more gases and one or more liquids. At least one of the fluids in the continuous phase may be the same or different from at least one of the fluids in the dispersed phase, and vice versa. In some embodiments, the continuous phase fluid and the dispersed phase fluid are contacted in the junction where said fluids undergo a shear force and a decrease in pressure to form one or more monodisperse microbubbles. In some embodiments, the continuous phase includes air and the dispersed phase includes water, and wherein the continuous phase and the dispersed phase are contacted in the junction to form one or more monodisperse micro-droplets. In some embodiments, the continuous phase includes at least two fluids and wherein the dispersed phase includes at least two different fluids, and wherein the continuous phase and the disperse phase are contacted in the junction to form one or more monodisperse micro-emulsions.

Figure 5:
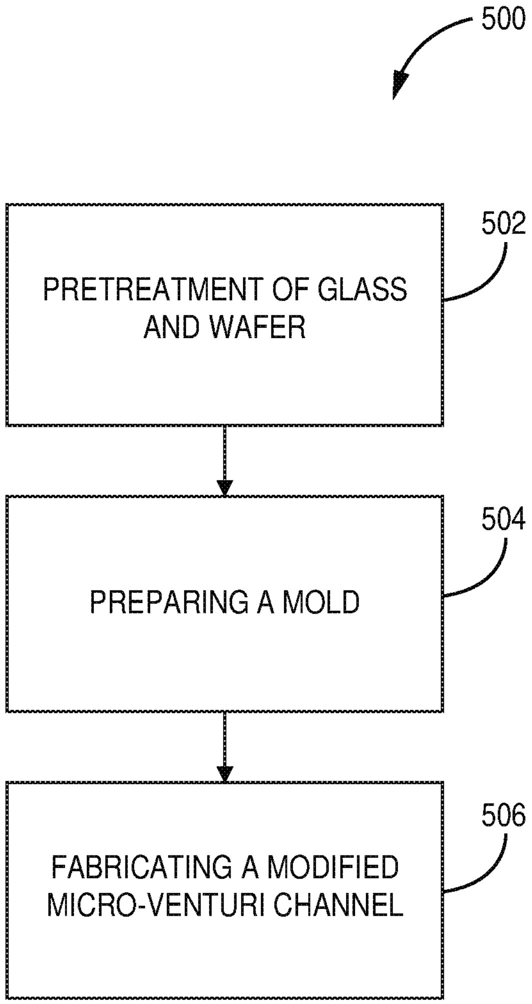
FIG. 5 is a schematic diagram of a method of fabricating a microfluidic device, according to one or more embodiments of the invention.

FIG. 5 is a flowchart of a method of fabricating microfluidic devices, according to one or more embodiments of the invention. As shown in FIG. 5, the method of fabricating the microfluidic devices may include one or more steps. For example, in some embodiments, the method of fabricating a microfluidic device may include one or more of the following steps. A first step 502 may include pre-treatment of glass and wafer. A second step 504 may include preparing a mold (e.g., SU-8 mold). A third step 506 may include fabricating a modified micro-Venturi channel using, for example, polydimethylsiloxane (PDMS).

The step 502 may include pre-treatment of a glass slide and a wafer. More specifically, the step 502 may include the pretreatment of a microscopic glass slide and a silicon wafer. In some embodiments, a microscopic glass slide, which may have a dimension of 76×26×1 $mm^3$, may be used as the substrate to which the PDMS modified micro-Venturi channel is bonded. The pre-treatment process may include the treatment of the microscopic glass slide and the silicon wafer. The pre-treatment of the glass slide may be carried out by soaking it in acetone, followed by treating it with a 1 molar potassium hydroxide on the vortex mixer (Scientific Industries, SI-T266) for about 5 to 10 seconds. The glass slide may then be cleaned with ethanol to remove the residue of potassium hydroxide solution from the glass slide. The glass slide may subsequently be washed with de-ionized water and dried by carefully blowing compressed nitrogen/air over it. The glass slide may then be placed inside the plasma cleaner for about 3 minutes in order to clean the remaining organics.

In some embodiments, a silicon wafer of diameter 100 mm and thickness of about 525+/−25 µm is used. One side of the silicon wafer may be polished and the resistivity may be about 0 to about 100 ohm-cm. Pre-treatment of the silicon wafer may be carried out by dehydration process which may be performed at about 130 degrees C. for about 10 minutes on a hot plate.

The step 504 may include the manufacture of a mold. For example, in some embodiments, the step 504 may include the fabrication of SU-8 mold. In general, SU-8 is a light-sensitive material except not to yellow light so, during the fabrication process, the mold may be prepared under yellow light. The photoresist of a select thickness may be uniformly coated on the substrate using a spin coater machine (e.g., Laurell Technologies, WS-650 Series) with a constant spin speed. The spin speed may vary and may depend upon the type of photoresist being used. The required uniform film thickness of the photoresist on the substrate may be about 20 µm which is obtained by using at least 4 ml of SU-8—2015 on a silicon wafer using a spin coater operating at a spin speed of about 500 rpm for the first 10 seconds and with an angular acceleration of about 100 rpm/s, followed by a spin speed of about 2000 rpm for about 30 seconds with an angular acceleration of about 300 rpm/s. In order to obtain uniform film thickness of 40 µm on the photoresist coating, the spin speed may be set to about 500 rpm for about the first 10 seconds with an angular acceleration of about 100 rpm/s, followed by a spin speed of about 1000 rpm for about 30 s with an angular acceleration of about 100 rpm/s. Table 4.1 represents film thickness in microns as a function of spin speed in rpm. After spin-coating, the photoresist coated or deposited on the substrate may be soft baked at about 65 degrees C. for about 2 minutes, followed by heating at about 95 degrees C. for about 6 minutes on a hot plate. Thereafter the wafer may be allowed to cool down to about room temperature. Depending upon the thickness of SU-8, film parameters such as soft bake time, exposure energy, post bake time and development time be varied. The table below shows the variation of these parameters with respect to thickness of SU-8.

TABLE-4.1

Variation of the Parameters According to the Thickness

| Thickness (µm) | Soft Bake Time (Minutes at 95° C.) | Exposure Energy ($mJ/cm^2$) | Post Bake Time (Minutes at 95° C.) | Development Time (Minutes) |
|---|---|---|---|---|
| 0.5-2 | 1 | 60-80 | 1-2 | 1 |
| 3-5 | 2 | 90-105 | 2-3 | 1 |
| 6-15 | 2-3 | 110-140 | 3-4 | 2-3 |
| 16-25 | 3-4 | 140-150 | 4-5 | 3-4 |
| 26-40 | 4-5 | 150-160 | 5-6 | 4-5 |

In some embodiments, a micro-lithography technique may be used to manufacture the PDMS micro-channel prototypes. Silicon wafer may be used as a substrate and SU-8 may be used as the photoresist in micro-lithography. A micro-lithography system may be used to print the design and/or pattern on the silicon wafer. The micro-lithography system may be connected to a computer and the required pattern/design of the modified micro-Venturi channel may be input into the system. The micro-lithography system may further include a laser assisted printing unit, a vacuum pump, an air compressor, an air filter, and software to control the lithography system (µPG 101 exposure wizard) which is installed on the computer. The printing may be carried out by a laser assisted printing head. The laser beam which is exposed to the photo resist coated wafer will be solidified, the remainder of which may be removed in the developing process. More specifically, SU-8 2015 is a negative photoresist so the region which is exposed to the laser will be solidified and the remaining coat can be entirely removed during the mold developing process.

The steps of standard exposure may include (a) design of the micro-Venturi channel; (b) loading the substrate; and (c) exposure and unloading the substrate. The design of the micro-Venturi channel may include any of the microfluidic devices disclosed herein. The substrate which is loaded into the micro-lithography system may include the soft baked SU-8 coated silicon wafer. The silicon wafer should be properly positioned on the stage of the lithography system. The substrate may then be exposed according to a write mode I, II, or III. In some embodiments, write mode III is employed for the exposure. The specifications of write mode III are provided in the Table 4.2.

TABLE 4.2

Specifications of write mode III.

| Specification | Write mode III |
|---|---|
| Address Grid (nm) | 200 |
| Minimum Structure Size (µm) | 5 |
| Write Speed (mm2/minute) | 90 |
| Edge Roughness (3σ, nm) | 400 |

TABLE 4.2-continued

| Specifications of write mode III. | |
|---|---|
| Specification | Write mode III |
| CD Uniformity [3σ, nm] | 800 |
| Alignment Accuracy [3σ, nm] | 800 |

The laser type, which may be used for the exposure, may include a UV diode class 3B with wavelength 375 nm and maximum power 70 mW. The power used may be about 68 mW with 90% and energy mode selected may be 2×4. The first number in energy mode may indicate the number of passes and the other number may be the speed reduction factor. After standard exposure the substrate may be unloaded and post baked at about 65° C. for about 3 minutes, followed by about 95° C. for about 9 minutes on a hot plate. The post baked silicon wafer may be thoroughly washed using a developer (e.g., propylene glycol mono methyl ether acetate) to develop the pattern or mold. Isopropanol may subsequently be used to clean the silicon wafer surface by removing the applied developer from it. After developing, the mold and the wafer may be hard baked at about 180° C. for about 30 minutes on a hot plate.

The step 506 may include fabrication of a PDMS-containing modified micro-Venturi channel. In some embodiments, this step may include the following process. Polydimethylsiloxane (PDMS) (e.g., obtained from Sylgard 184) may be mixed with a curing agent (Sylgard 184) in a petri dish at a ratio of about 10:1. Then the solution may be stirred to mix polymer and subsequently poured over the developed mold which may be provided in a plastic petri dish. It is noted that, while mixing the polymer solution, small air bubbles may become trapped in the solution. To remove the trapped air bubbles from the polymer solution, the whole system may be kept inside a vacuum oven at about ambient temperature for about 30 minutes. The average time is about 30 minutes but, it may vary depending upon the bubbles in each case. It is usually desirable to remove all or at least a portion of any bubbles. The PDMS may then be cured by heating at about 60° C. for about 8 hours on a hot plate. After the curing period, the PDMS channel may be hardened.

The cured PDMS channel is generally hydrophobic in nature, which may be hard to bond to the glass slide. In order to make the PDMS channel hydrophilic, both the PDMS and glass slide may be exposed to the oxygen plasma using plasma cleaner (e.g., Harrick Plasma, PDC-32-G). Initially the glass slide may be kept in the plasma cleaner for about 3 minutes followed by the PDMS channel for about 30 seconds. The channel side may then be placed on top of the glass slide and a slight pressure may be applied to the corners of the PDMS channel to initiate bond formation and/or form a bond. A highly stable and strong bond may be formed between the glass slide and PDMS channel after the plasma treatment. In order to achieve a proper bonding between glass slide and the PDMS channel, it may optionally be kept on a hot plate at a temperature of about 80° C. for about 15 minutes.

In some embodiments, low density polyethylene micro-tubing (e.g., from Scientific Commodities Inc.) with inner and outer diameter dimensions of about 1.14 mm and 1.63 mm, respectively, may be used as both inlet and outlet of the PDMS channel. The length of inlet tube may be about 26 cm. Epoxy glue may optionally be used for fixing both inlet and outlet tubing to said channel.

Figure 6:
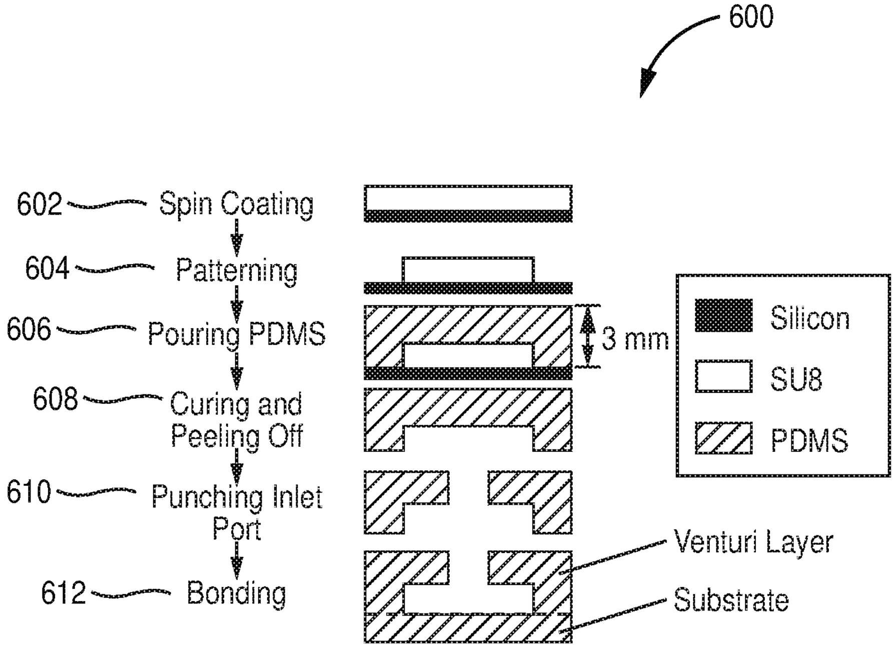
FIG. 6 is a schematic diagram of a method of fabricating a microfluidic device, according to one or more embodiments of the invention.

FIG. 6 is a schematic diagram of a method of fabricating a microfluidic device, according to one or more embodiments of the invention. As shown in FIG. 6, the fabrication of the modified micro-Venturi channel may include depositing 602, for example by spin-coating, a photoresist layer such as SU-8 on a surface of a substrate, such as a silicon wafer. A pattern may be formed 604 on the wafer by a micro-lithography process to obtain a mold. A suitable material, such as PDMS, may be deposited 606 on the mold and subsequently cured and peeled 608 therefrom. In some embodiments, inlets may be formed 610 for supplying the continuous phase fluid and the dispersed phase fluid. Finally, the PDMS layer may be bonded 612 to a substrate to obtain a microfluidic device. The method of fabricating the microfluidic device depicted in FIG. 6 may be the same and/or similar to the steps 504 and 506.

Figure 7A:
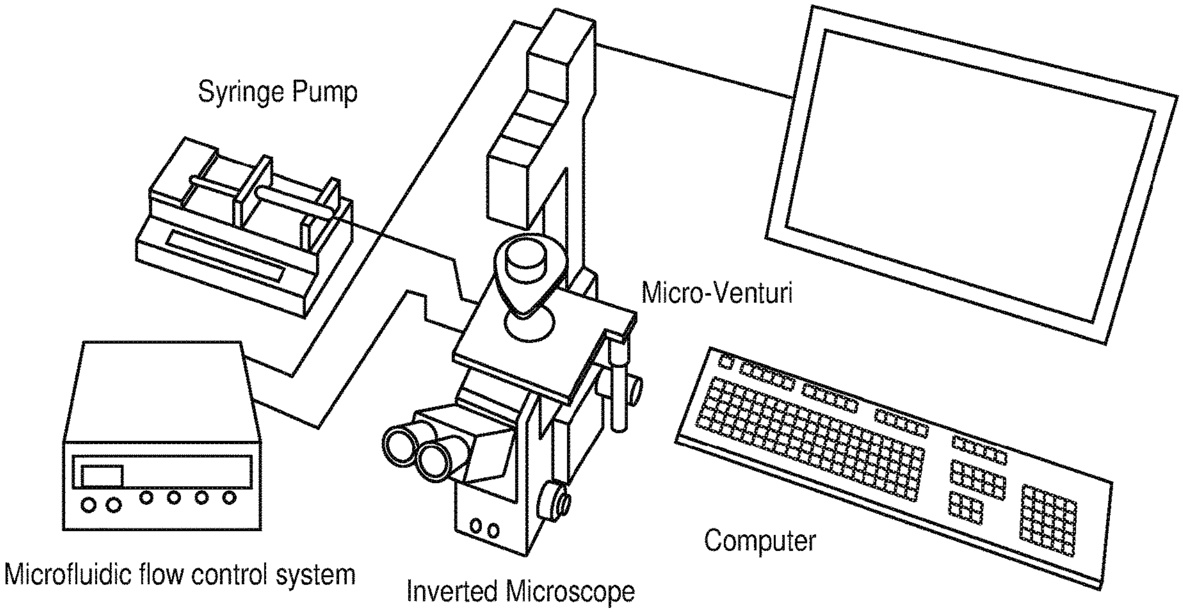
FIG. 7A is a schematic diagram of a microfluidic setup, according to one or more embodiments of the present invention.

An experimental setup is depicted in FIG. 7A, according to one or more embodiments of the invention. The experimental setup may include one or more of a transparent modified micro-Venturi channel of depth 40 μm, a high-speed camera, a syringe pump system, a mass flow controller, a computer, and an optical microscope with a light source for flow visualization are provided (FIG. 7A). The working fluids may include de-ionized water and air. The de-ionized water pressure may be controlled by the mass flow controller and initially, may be kept at a low pressure and held constant at about 40 mbar. The mass flow controller may have one or more of an air compressor, an air filter, a pressure regulator, and a liquid reservoir. Air may be injected at a constant flow rate into the junction of the channel (e.g., the "T junction" of the channel) using the syringe pump. The images of the generated bubbles may be captured using Leica High Speed Camera which may be connected to the microscope and the computer. The digital images may be acquired using the computer and analyzed. The temperature of the working fluids (water and air) may be held at a constant temperature, such as a temperature of about 21° C. The modified micro-Venturi channel may include an inlet section, a convergent section, a vena contracta section, a divergent section, an outlet section, and an orthogonal section. The total length of micro-venturi tube may be about 52 mm. Details of inlet and outlet sizes are reported in Table 1.

TABLE 1

Inlet and outlet dimension of the micro-venturi channels

| Channel Sections | Width (mm) | Length (mm) | Convergent Angle (°) | Divergent Angle (°) |
|---|---|---|---|---|
| Inlet | 8.5 | 4 | 30 | — |
| Vena-Contracta | 0.23 | 6 | — | — |
| Outlet | 8.5 | 10 | — | 30 |

Figure 7B:
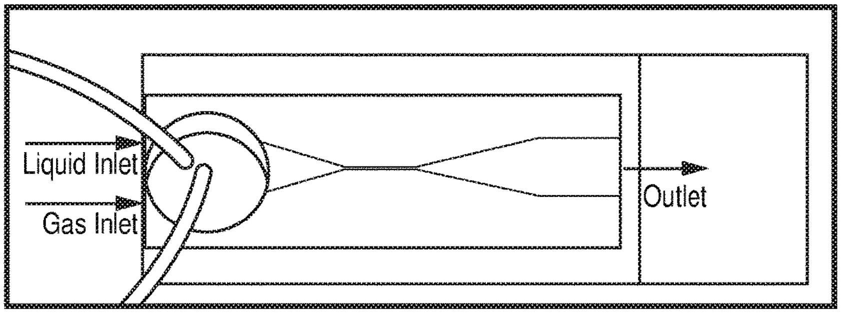
FIG. 7B is a schematic diagram of a conventional micro-venturi channel (model 1), according to one or more embodiments of the present invention.
Figure 7C:
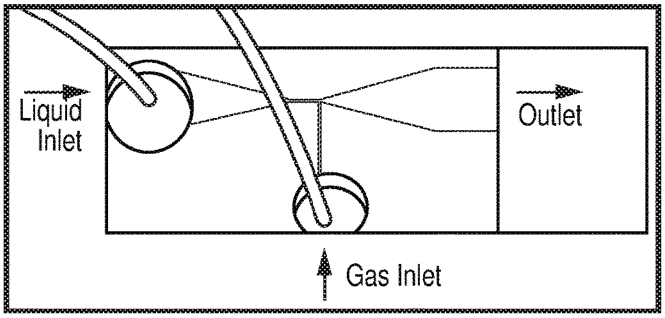
FIG. 7C is a schematic diagram of a modified micro-venturi channel (model 2), according to one or more embodiments of the present invention.

The experimental setup may include an evaluation of two channel designs—including, a regular channel design (model 1) and a modified micro-Venturi channel (model 2). For model 1, both working fluids, liquid and gas, were injected at adjacent points of the channel inlet using a flow control system (Fluigent) and a syringe pump, respectively. See FIG. 7B. For model 2, gas bubbles were generated based on a cross flow rupture technique, or T-junction technique. The gas inlet was located perpendicular to the vena contracta section at the throat-diffuser section of the micro-Venturi channel having a width and length of 0.23 mm and 10 mm, respectively. (FIG. 7C).

Images of the generated bubbles were captured using Leica High Speed Camera which was connected to the microscope and to the computer. The height and width of the image, frame rates, and shutter speeds were adjusted using Highspec software. The region of interest was the intersection of the vena-contracta and the diffuser section. Details of the test conditions are summarized in table 2. The capillary number defined by $$Ca = \frac{\eta v}{\gamma},$$

where, $\eta$ is the dynamic viscosity, $v$ is the velocity of the flow and $\gamma$ is the interfacial tension between the liquid and gas, was calculated for each case.

Figure 8A:
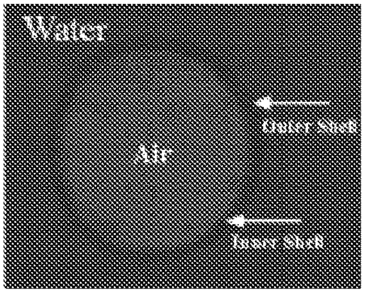
FIGS. 8A-8C show (A) a greyscale recorded image of a microbubble; (B) the recorded image converted to a binary image of the microbubble for calculating the area of the microbubble; and (C) the recorded image converted another binary image for detecting the edge or liquid-gas interface (e.g., for edge detection), according to one or more embodiments.
Figure 8B:
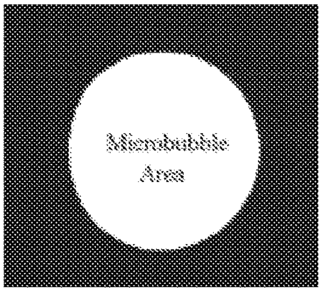
Figure 8C:
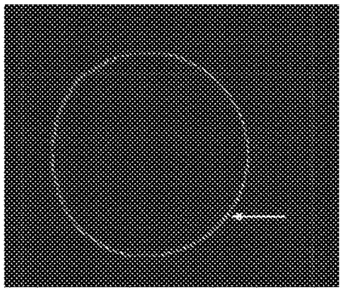
Figure 9A:
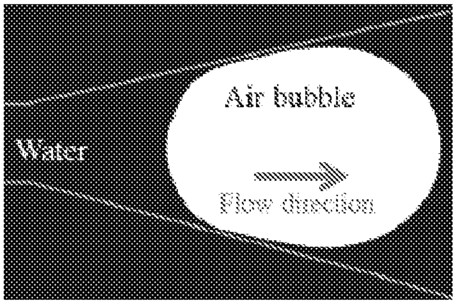
FIGS. 9A-9D are images of microbubbles generated from the micro-venturi channel (model 1) (FIG. 7B): (A) at t=0 ms, (B), t=74.8 ms, (C) t=260.8 ms, and (D) t=720 ms, according to one or more embodiments of the present invention.
Figure 9B:
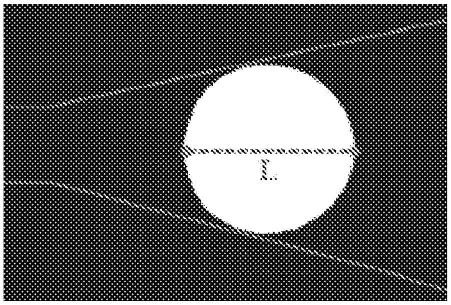
Figure 9C:
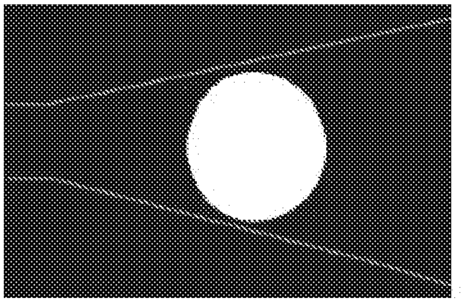
Figure 9D:
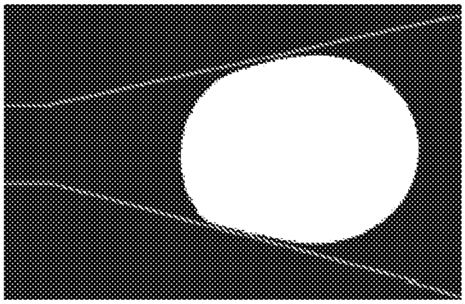
Figure 9E:
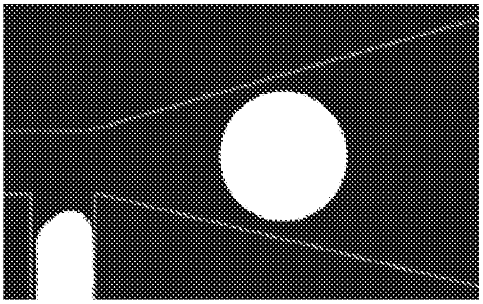
FIGS. 9E-9H are images of microbubbles generated from the modified micro-venturi channel (model 2) (FIG. 7C): (E) t=0 ms, (F) t=133 ms, (G) t=1563 ms, and (H) t=1663 ms, according to one or more embodiments of the present invention.
Figure 9F:
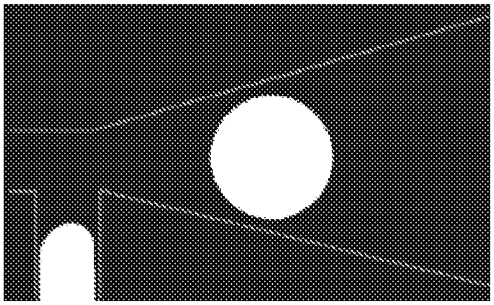
Figure 9G:
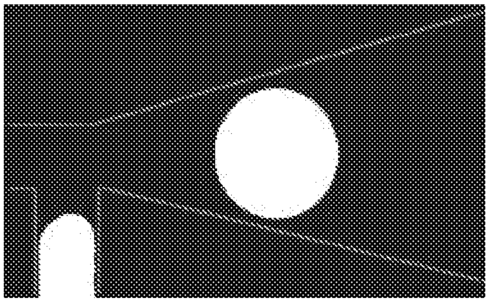
Figure 9H:
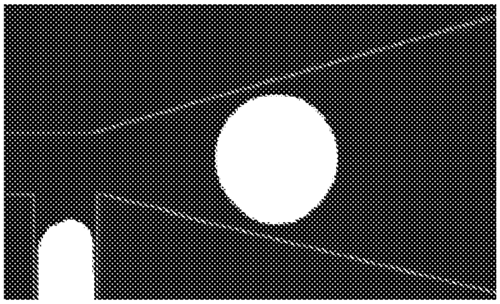

The recorded digital images of the microbubble were analyzed using software (e.g., such as Matlab). Characteristics of gas bubbles were analyzed using algorithms which are capable of detecting gas-liquid interfaces. The obtained images (FIG. 8A) were converted to binary images (FIG. 8B) to detect the liquid-gas interface (FIG. 8C) and to calculate the area of the microbubble. The obtained images may be enhanced using a low-light image enhancement function to help smooth the surface, further improving the brightness level and visibility of the image. The optimum threshold and sensitivity values may be identified and applied to all images. The enhanced image may be converted to the binary image (FIG. 8B) to detect the inner liquid-gas interface. The liquid-gas interface may be identified using an edge-detection function, which is an image processing technique applied for identifying the edges of the required objects in an image. The inner area of the bubble, which is colored in white, is provided in FIG. 8C.

TABLE 2

| Experimental Test Conditions | | | |
|---|---|---|---|
| Test Case | $\Delta P_{liquid}$ (mbar) | Capillary Number (Ca) | $Q_{gas}$ (µl/hr) |
| 1 | 40 | 8.77E−05 | 0 to 6000 |
| 2 | 60 | 1.32E−04 | |
| 3 | 80 | 1.75E−04 | |
| 4 | 100 | 2.19E−04 | |

The microbubbles generated in both models 1 and 2 were compared. The characteristics of microbubbles were studied at the outlet region of the vena contracta for two models. FIGS. 9A-9H show sequential images of microbubbles with time, for both models, at the outlet of Vena-Contrata. Microbubbles generated in model 1 are presented in FIGS. 9A-9D. It was observed that microbubbles were generated randomly in time and attempts to control or attain stable microbubbles, with a given size, were not achieved using model 1. model 2 was able to obtain stable and regular microbubbles (FIGS. 9E-9H). It was important to note that both microbubbles were generated for the same flow conditions in both cases. In order to obtain quantitative results, the horizontal length of microbubble, their frequency and bubble areas were measured at intersection between the vena-contracta region and the diffuser section of the micro-Venturi channel.

Figure 10:
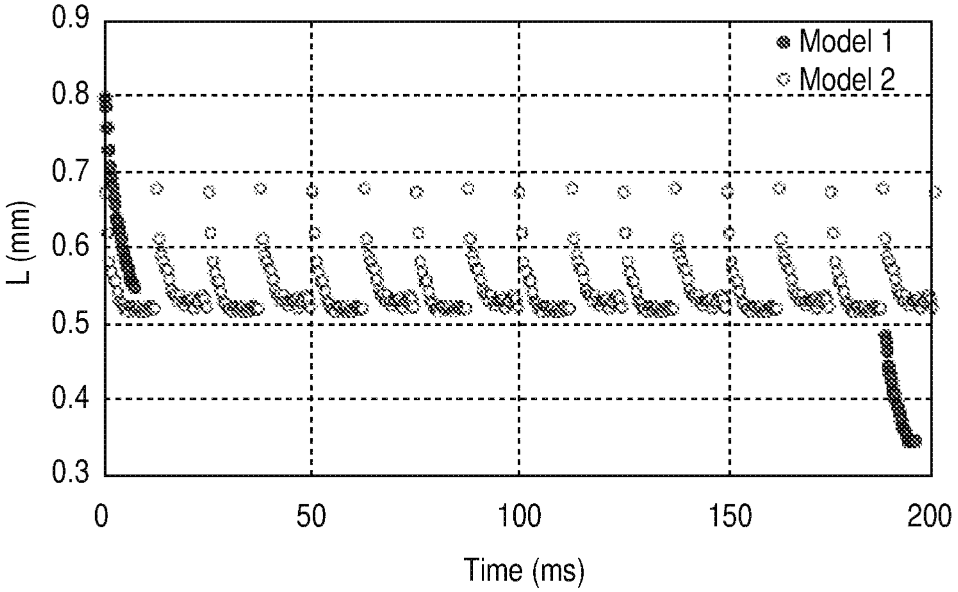
FIG. 10 is a graphical view showing the variation in distance between horizontal edges of microbubbles for both models at $Q_{gas}$=6000 µl/hr at $\Delta P_{liquid}$=80 mbar, according to one or more embodiments of the present invention.

FIG. 10 shows the variation of the horizontal length of the bubble (indicated in FIG. 9B) with time. It was observed that the horizontal length decreases in both cases because the bubble geometry changes from an ellipsoidal shape to a circular shape with time. For model 1, only two microbubbles were recorded during 200 ms, having different horizontal length and therefore difference size. For model 2, 16 microbubbles were generated during the same time and for the same flow conditions. Horizontal length of these microbubbles decreased from 0.68 mm to 0.52 mm. Within approximately 5 milliseconds, microbubbles adopted a circular shape having a constant diameter of 0.52 mm. The microbubble size was constant for the given flow parameters.

Figure 11:
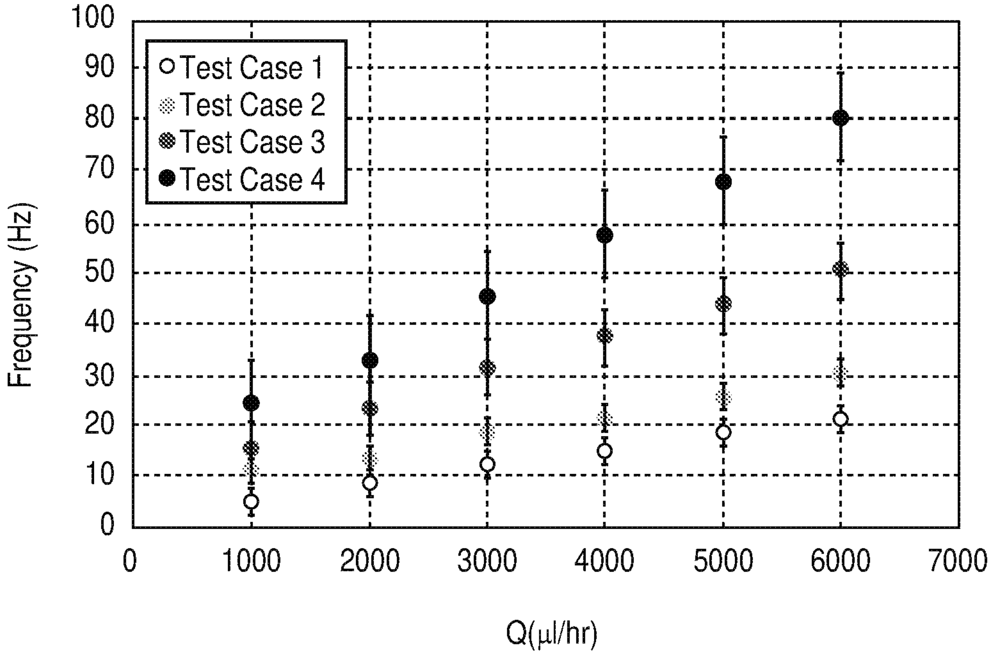
FIG. 11 is a graphical view showing the bubble frequency against liquid flow rate for the modified micro-venturi channel (model 2), according to one or more embodiments of the present invention.

The frequency of microbubble generated using model 2, was measured and reported in FIG. 11 for varying flow rates held at different constant pressures, with Test Case 1 referring to P40, Test Case 2 referring to P60, Test Case 3 referring to P80, and Test Case 4 referring to P100. A direct relationship between the number of generated microbubbles to the flow inlet parameters was observed. FIG. 11 shows that the frequency increased with respect to increasing air flow rates and water pressures. The relationship between microbubbles frequencies and air flow was linear.

The area of the microbubble, for model 2, was measured and presented in Table 3. It was observed that for a given flow parameters (fixed air flow rate and water pressure) the size of microbubbles was constant. It was also observed that the size microbubble decreased as the air flow rate decreased for a constant liquid flow rate. This was likely due to the fact that, when the air flow rates were decreased, less air was trapped in the continuous phase (water), leading to smaller microbubbles.

TABLE 3

| $Q_w/Q_g$ | Microbubble Area (mm$^2$) |
|---|---|
| 0.043 | 0.23 |
| 0.052 | 0.20 |
| 0.087 | 0.18 |
| 0.13 | 0.13 |
| 0.26 | 0.11 |

Figure 14A:
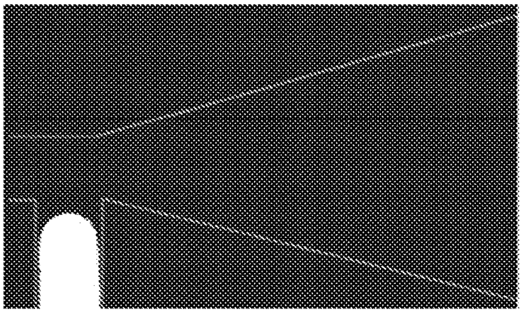
FIGS. 14A-14F are images illustrating the breakup mechanism of a gas bubble in a modified micro-Venturi channel at $\Delta P_{liquid}$=80 mbar and $Q_{gas}$=4000 µl $h^{-1}$: (a) t=0 ms; (b) t=37 ms; (c) t=51 ms; (d) t=58 ms; (e) t=60 ms; and (f) t=65 ms, according to one or more embodiments of the invention.
Figure 14B:
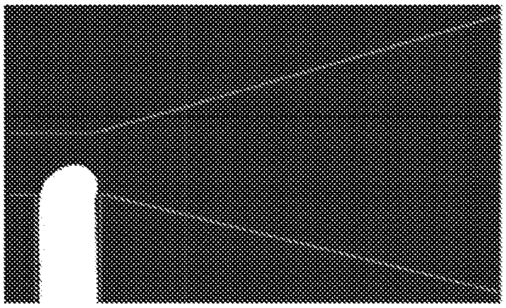
Figure 14C:
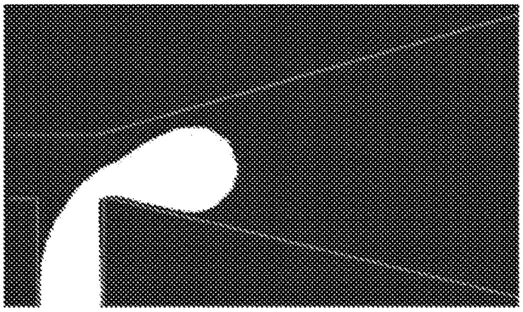
Figure 14D:
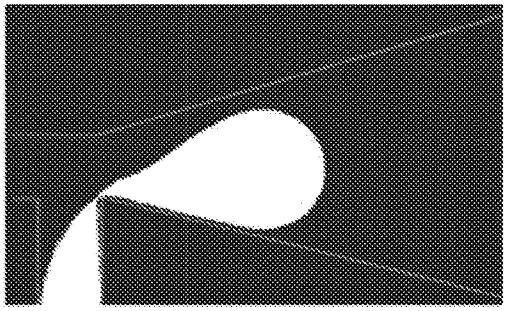
Figure 14E:
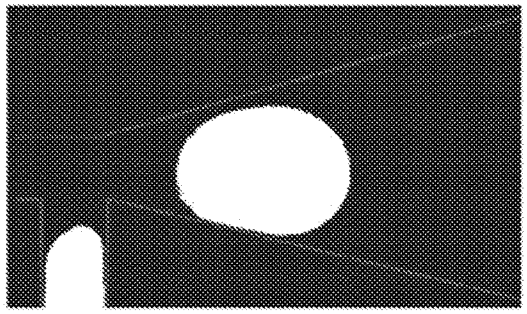
Figure 14F:
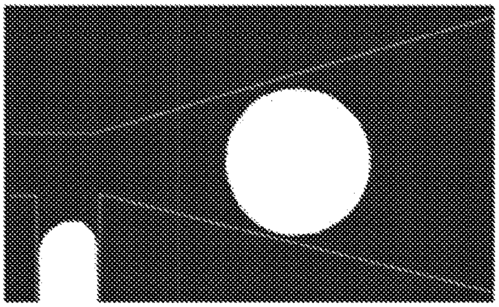

In order to understand the formation of microbubbles, the dynamics of the bubble breakup mechanism, in a modified micro-Venturi channel, was investigated. As shown in FIGS. 14A-14F, during the early stage (FIG. 14A), the gas bubble with a concave leading edge entered the channel perpendicular to the vena-contracta section. The size of the gas bubble was limited to the width of the channel (0.23 mm) At t=37 ms, the gas bubble reached the main flow at the throat—diffuser section. The gas bubble's leading edge gets altered by the force of the main liquid flow from the left to the right side (FIG. 14B). At t=57 ms, the gas bubble's size expanded in the downstream direction (FIG. 14C) and partially filled the expanded outlet region of the micro-Venturi channel The neck of the gas bubble, characterized by a distance "d" in FIG. 15, decreased with time (FIG. 14D) until rupture of the gas bubble (FIG. 14E). Finally, within 5 ms, the appearance of the gas bubble changed from an ellipsoidal shape to a circular shape, having a constant diameter and moving in the downstream direction of the liquid flow (FIG. 14F).

Figure 15:
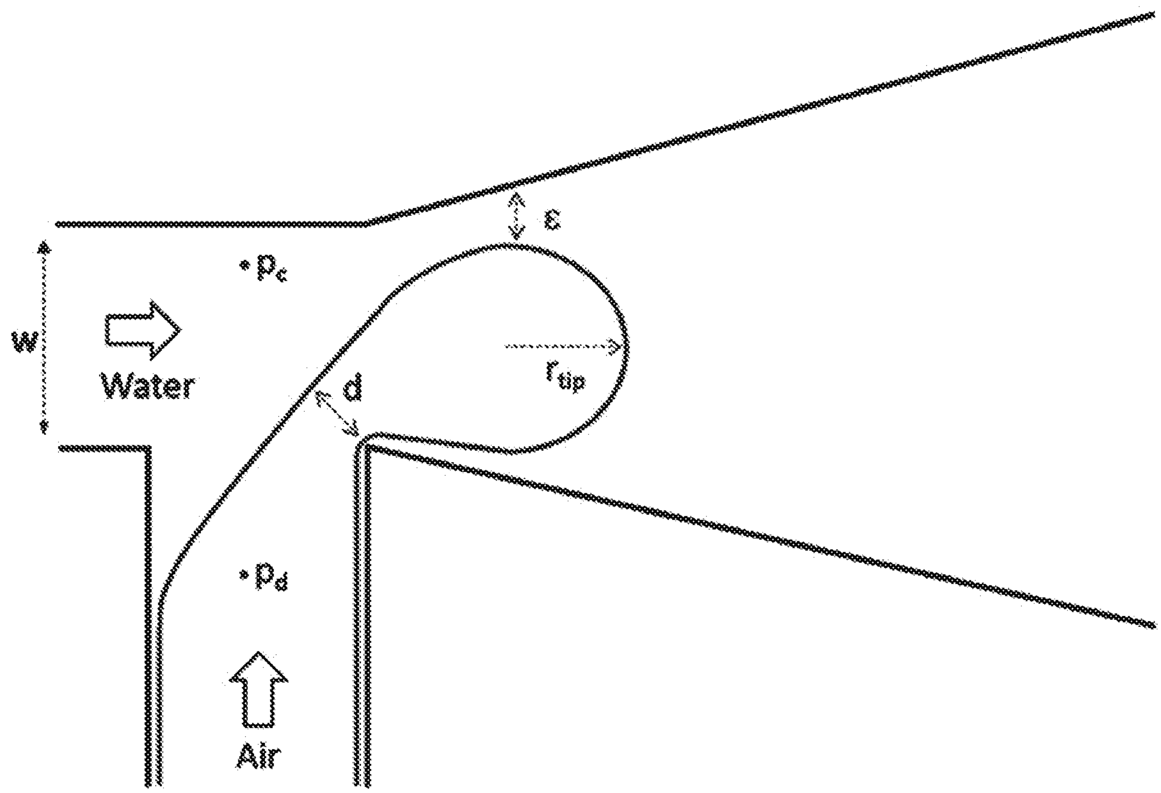
FIG. 15 is a schematic illustration of a bubble breakup at the junction of a modified micro-Venturi channel, according to one or more embodiments of the invention.

A difference between the T-Junction geometry and the design of the modified micro-Venturi channel was the extension of the channel width, located at the downstream of the continuous phase (outlet of the micro-Venturi Channel), which changed the influence of driving forces for the breakup mechanism. The breakup mechanism depended on three stresses: (i) interfacial stress, (ii) viscous shear stress, and (iii) resistance to flow of the continuous phase (higher flow rate at ε, see FIG. 15). For a T-junction geometry, it was found that the only stabilizing force in the system was the surface tension force. In addition, the breakup occurred due to stress exerted at the tip of the gas bubble. For the modified micro-Venturi geometry, the size of the air bubble was not constrained by the width of the channel (W). Therefore, the tip of the discontinuous phase grew in the outlet region (with $r_{tip}$>W/2) and filled the channel partially due to the continuous increase in the channel width in the axial direction (FIG. 15). Hence, the surface tension force was not a stabilizing force in the present design, and this was a difference compared to the T-junction design. To summarize, the breakup mechanism was due to the pressure drop associated with the resistance to flow of the continuous fluid around the immiscible tip ($p_c-p_d$). However, the destabilizing force of surface tension allowed only the production of circular bubbles with a uniform size. Elongated bubbles could not be produced with this modified micro-Venturi design. The size of the produced microbubbles was not constrained by the size of the microchannel and depended on the control parameters ($Q_{gas}$ and $Q_{liq}$).

Monodispersed microbubbles were generated successfully in a modified micro-Venturi channel with water as the continuous phase and air as the dispersed phase. Characteristics of gas bubbles were analyzed with software (e.g., Matlab) using algorithms which were capable of detecting gas—liquid interfaces. The mechanism of microbubble breakup in the modified micro-Venturi channel was described, and it was observed that the size of the microbubbles was not restricted by the microchannel size and depends on the control parameters, which included liquid and gas flow rates. It was observed that the modified micro-Venturi channel provided controlled monodispersed microbubbles. It was determined that the size and frequency of the obtained monodispersed microbubbles could be varied based on liquid pressure and gas flow rates. This proposed design could be used in various medical and pharmaceutical applications for controlled generation of microbubbles.

More details regarding the above-described investigations are provided herein below. For example, in some embodiments, an experimental investigation of two-phase flow in a modified micro-Venturi channels was carried out with water as the continuous phase and air as the dispersed phase. Two models of venture tubes were compared—namely regular micro-venturi channel (model 1) in which both working fluids, liquid and gas, were injected at adjacent points of the channel inlet and a modified micro-venturi channel (model 2) in which gas bubbles were generated based on the cross flow rupture technique. It was observed that model 2 provided controlled monodispersed microbubbles. It can be concluded that the size, and the frequency of the obtained monodispersed microbubbles could be varied based on liquid pressure and gas flowrates. Applications involving the proposed design include various medical and pharmaceutical industries to produce controlled microbubbles.

The experimental investigation was continued to evaluate the influence of the flow control parameters (e.g., influence of water flow rates, air flow rates, water pressure, air pressure individually and relative to each other) on the controlled generation of bubbles. Two phase flow characteristics for a specific range of air flow rates and water pressure were evaluated. Two different test models were fabricated and used to generate microbubbles and the mechanism was captured using a high-speed digital camera attached to an inverted microscope. In the case of the modified micro-Venturi channel, images of the intersection of the orthogonal section, constant-width section, and divergent section were taken using the camera and analyzed. Experiments were conducted in a PDMS microfluidic-device including a modified micro-Venturi channel. The flow control parameters were varied to obtain various flow patterns and sizes of produced microbubbles. An investigation was also performed to gain an insight into the effects of liquid and gas flow rates on microbubble generation frequency in the microfluidic device.

Figure 12A:
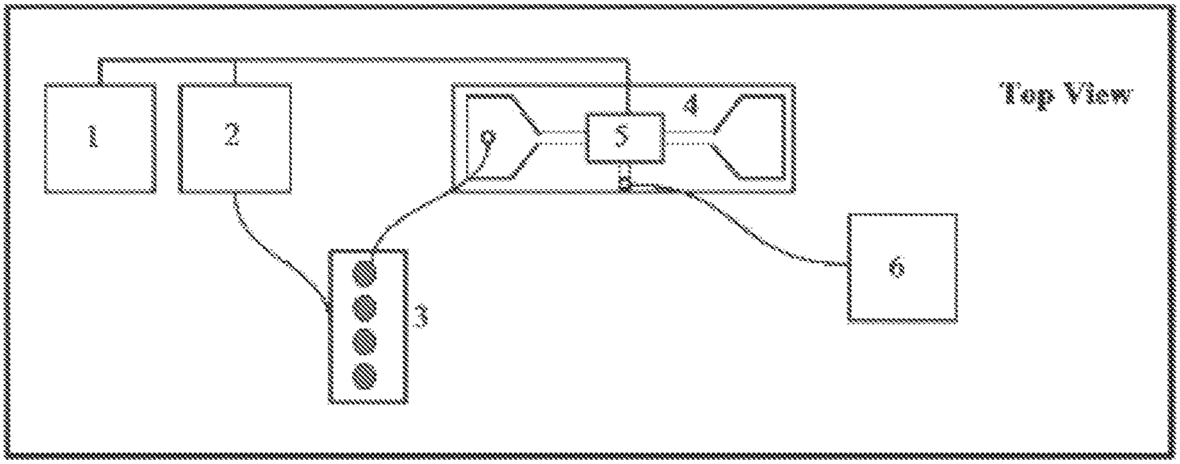
FIGS. 12A-12B are schematic diagrams of an experimental setup showing (A) a top view and (B) a side view, according to one or more embodiments of the invention.
Figure 12B:
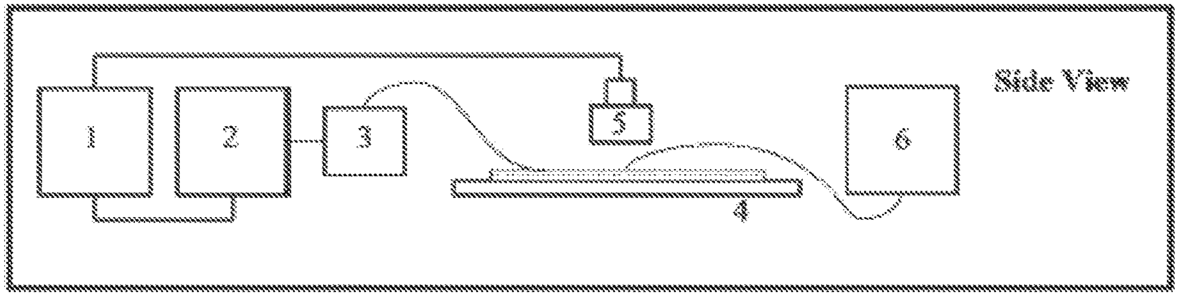
Figure 13A:
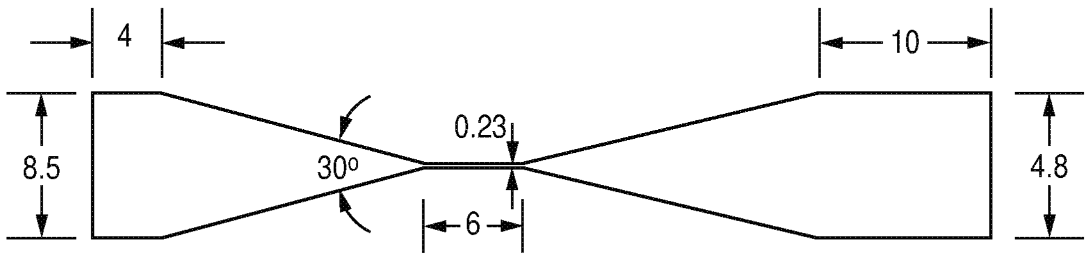
FIGS. 13A-13B are schematic diagrams illustrating (A) a design of model 1 and (B) a design of model 2 (dimensions shown in mm), according to one or more embodiments of the invention.
Figure 13B:
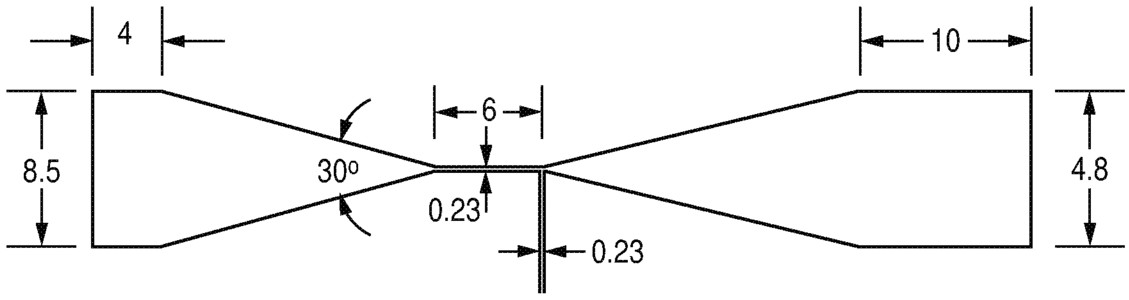

FIGS. 12A-12B are schematic diagrams of the experimental setup illustrating (A) a top view and (B) a side view, according to one or more embodiments of the invention. The system utilized included a homogeneous PDMS microfluidic device including a modified micro-Venturi channel, an optical microscope with a light source, a high-speed camera, a syringe pump system, a mass flow controller and accompanying software, and a computer. See FIGS. 13A-13B for the design of (A) a micro-Venturi channel (model 1) and (B) a modified micro-Venturi channel (model 2), according to one or more embodiments of the invention.

The mass flow controller was a microfluidic mass flow controller including an air compressor, an air filter, a pressure regulator, a unit with four independent reservoirs for storing working fluids where each of the reservoirs could be pressurized to a maximum value of 1034 mbar, and software to control the mass flow controller. The working fluids included deionized water as the continuous phase fluid and air as the dispersed phase fluid. At least one reservoir was filled with deionized water and connected to the continuous phase supply inlet of the first microfluidic channel via a transparent tube of internal diameter 1.14 mm and outside diameter of 1.63 mm. A dispersed phase supply inlet was connected to a syringe pump using the same transparent tube to control the volumetric flow rate of air. Prior to operation, the deionized water was flowed through the microfluidic device at low pressure to remove air present within the transparent tube and microfluidic device channels, optionally to achieve laminar flow. Once bubble-free flow through the channel was achieved, the pressure of the water may be adjusted to the required level and maintained at said level. Air may then be injected into the second microfluidic channel and allowed to flow via the orthogonal section to the distal end of the vena-contracta section (i.e., the junction) which is adjacent to and upstream from the divergent section of the third microfluidic channel using the syringe pump by setting a desired flow rate. The deionized water pressure may be kept at a lower pressure of about 40 mbar and held constant. The air may initially be supplied to the second microfluidic channel at a volumetric flow rate of about 1000 μl/hr. Images of generated microbubbles may be captured using a high-speed camera. The height and width of the image, frame rates, and shutter speeds may be adjusted using software.

Table 7.1 summarizes the experimental testing conditions. The whole process was repeated four times. The volumetric flow rate of the air was increased from 1000 to 2000, 3000, 4000, 5000, 6000 μl/hr while keeping the water pressure constant. In addition, microbubble production was also evaluated for different water pressures, including 60 mbar, 80 mbar, and 100 mbar. For example, for water pressures of about 60 mbar, the volumetric flow rate of the air was increased from 1000 to 2000, 3000, 4000, 5000, and 6000 μl/hr while holding the water pressure constant; and so on for the other water pressures. The produced microbubbles were visualized and analyzed by using an inverted telescope to capture images of produced microbubbles in the divergent section near the junction (e.g., just downstream from the junction). The images were processed and analyzed.

TABLE-7.1

Experiment test conditions.

| Test Case | Pressure (mbar) | Mass flow rate (μl/hr) |
|---|---|---|
| 1 | 40 | 1000-6000 |
| 2 | 60 | 1000-6000 |
| 3 | 80 | 1000-6000 |
| 4 | 100 | 1000-6000 |

For flow visualization, the setup included a PDMS micro-Venturi-channel, a microscope with a high-speed camera, a light source, the computer with the software to control and capture images and various components of micro fluidic mass flow controller. An inverted microscope with a high-speed camera and a light source was used to visualize the two-phase flow in the micro-Venturi channel. The high-speed camera was connected to the computer and the live feed was seen on the computer screen using the Highspec software. The image quality was improved by modifying the image properties in the software control panel. The digital images were acquired and analyzed using software (e.g., such as Matlab).

For image analysis, the bubble size distributions from the recorded images were analyzed using different algorithms which were capable of detecting air bubbles in the water. The acquired digital images were colorless or in gray scale and were analyzed. A code was used to convert the grayscale images to a binary image, binary images to calculate the area of the bubbles. A suitable threshold value was selected using a trial-and-error method. The threshold value used for converting grayscale image to binary image was kept at 0.6. All the images were analyzed using same threshold value for attaining uniformity throughout the analysis. The inner diameter of the bubble was selected to measure the area. After running the code for calculating the area, the area inside the bubble turned from a black color to a white color, indicating the area measured.

A right-handed coordinate system, centered at the primary inlet, was used to orient the measurements. The positive X-axis pointed in the direction of the incoming de-ionized water, the Y-axis pointed in the direction of the injected air, and the Z-axis lied on the plane containing the orifice such that it completed a right-handed coordinate system. The distances along the X, Y and Z axes were denoted using the variables x, y and z respectively.

Microbubbles were generated using two different micro-Venturi channels and were visualized in detail by capturing the images by means of a visualization technique with a high spatial and temporal resolution. A high-speed camera which was connected to an inverted microscope was used as the main visualization device. Two micro-Venturi models were utilized. The region of interest was the intersection of the vena-contracta section and the diffuser section. The instantaneous images of the generated microbubbles for both models were captured at two different frame rates due to the difference in the region of interests.

The recorded images of the microbubbles were analyzed carefully using software (e.g., such as Matlab). Three sets of images were recorded to check the repeatability of the microbubbles. All the images were processed and enhanced using the same set of comprehensive algorithms.

To evaluate the influence of the control parameters on bubble area, the area of the microbubbles was also measured by means of the image processing techniques. An algorithm was written to calculate the inner area of the generated microbubbles. Uniform thresholding was applied for all the images to convert them into binary images.

The area of the microbubble increased with increasing mass flow rate of the air. As discussed earlier, the microbubbles were generated very close to the diffuser section in the model 2. In the case of model 1, the air and water inlets were located adjacent to the micro-Venturi inlet. The bubbles had to move towards the converging section, passing the vena-contracta and then the diffuser section. The pressure imbalance in each of the sections influenced the bubble area.

To evaluate the influence of the control parameters on bubble frequency, the inlet control parameters had a significant influence on the microbubble frequency. It was observed that the bubble frequency was increasing with increasing air mass flow rates and water pressures (FIG. 11).

$$f = \text{number of bubbles/time}$$

Monodispersed microbubbles have been generated successfully in a modified micro-Venturi channel with water as the continuous phase and air as the dispersed phase. Characteristics of gas bubbles were analyzed using algorithms which are capable of detecting gas—liquid interfaces. The mechanism of micro-bubble breakup in the modified micro-Venturi channel is described, and it was observed that the size of the microbubbles was not restricted by the micro-channel size and depends on the control parameters, which are liquid and gas flow rates. It was observed that the modified micro-Venturi channel provided controlled monodispersed microbubbles. It can be concluded that the size, velocity, and frequency of the obtained monodispersed microbubbles could be varied based on liquid pressure and gas flow rates. This proposed design could be used in various medical and pharmaceutical applications for controlled generation of micro-bubbles. Accordingly, the microfluidic devices of the present invention may be used in a wide array of applications, including for example, water treatment, oil separation, drug and microparticle transfer, diagnostic imaging and therapeutic applications, fermentation of soil, aquaculture productivity, bio-sensing and various other processes and/or applications.

What is claimed is:

1. A microfluidic device for producing at least one of monodisperse microbubbles, monodisperse micro-droplets, and monodisperse micro-emulsions, the microfluidic device comprising:

- a first microfluidic channel for supplying a continuous phase fluid, the first microfluidic channel including a convergent section and a constant-width section downstream from the convergent section, wherein the constant-width section discharges into a junction and has a hydraulic diameter of no greater than about 1 mm;
- a second microfluidic channel for supplying a dispersed phase fluid, the second microfluidic channel including an orthogonal section oriented orthogonal to the constant-width section, wherein the orthogonal section discharges into the junction; and
- a third microfluidic channel for conveying produced microbubbles, the third microfluidic channel including a divergent section, wherein the junction discharges into the divergent section.

2. The microfluidic device according to claim 1, wherein the continuous phase fluid includes water.

3. The microfluidic device of claim 1, wherein the dispersed phase fluid includes air.

4. The microfluidic device of claim 1, wherein the convergent section includes sidewalls that converge towards the constant-width section at a convergent angle and wherein the divergent section includes sidewalls that diverge away from the constant-width section at a divergent angle.

5. The microfluidic device of claim 4, wherein the convergent angle and the divergent angle are identical.

6. The microfluidic device of claim 4, wherein the convergent angle and the divergent angle are different.

7. The microfluidic device of claim 1, wherein the constant-width section includes a vena contracta region.

8. The microfluidic device of claim 1, wherein the width of the constant-width section and the width of the orthogonal section are the same.

9. The microfluidic device of claim 1, wherein a length of the constant-width section is at least 5 times the width of the constant-width section.

10. The microfluidic device of claim 1, wherein a pressure of one or more of the continuous phase fluid and the dispersed phase fluid in the divergent section is less than a pressure of one or more of the continuous phase fluid and the dispersed phase fluid in the convergent section.

11. The microfluidic device of claim 1, wherein a velocity of the continuous phase fluid flowing through the constant-width section is greater than a velocity of the continuous phase fluid flowing through the convergent section.

12. A method of producing monodisperse microbubbles, the method comprising:

providing a microfluidic device including a first microfluidic channel including a convergent section and a constant-width section downstream from the convergent section, a second microfluidic channel including an orthogonal section oriented orthogonal to the constant-width section, and a third microfluidic channel including a divergent section, wherein the constant-width section and the orthogonal section discharge into a junction, wherein the junction discharges into the divergent section, and wherein the constant-width section has a hydraulic diameter of no greater than about 1 mm;

supplying a flow of a continuous phase fluid through at least the divergent section and the constant-width section of the first microfluidic channel into the junction; and supplying a flow of a dispersed phase fluid through at least the orthogonal section of the second microfluidic channel into the junction to produce one or more monodisperse microbubbles.

13. The method according to claim 12, wherein the continuous phase fluid and the dispersed phase fluid are contacted in the junction where said fluids undergo a shear force and a decrease in pressure to form one or more monodisperse microbubbles.

14. The method of claim 13, wherein the monodisperse microbubbles are produced with a diameter of about 100 μm or less.

15. The method according to claim 13, wherein the continuous phase includes air and the dispersed phase includes water, and wherein the continuous phase and the dispersed phase are contacted in the junction to form one or more monodisperse micro-droplets.

16. The method according to claim 13, wherein the continuous phase includes at least two fluids and wherein the dispersed phase includes at least two different fluids, and wherein the continuous phase and the disperse phase are contacted in the junction to form one or more monodisperse micro-emulsions.

17. The method of claim 13, wherein the continuous phase fluid is supplied at a fluid pressure in a range of about 10 mbar to about 500 mbar, and wherein the dispersed phase fluid is supplied at a flow rate of about 1000 ul $hr^{-1}$ to about 7000 μl $hr^{-1}$.

18. The method of claim 13, wherein the width of the constant-width section and the width of the orthogonal section are identical.

19. The method of claim 13, wherein a pressure of one or more of the continuous phase fluid and the dispersed phase fluid in the divergent section is less than a pressure of one or more of the continuous phase fluid and the dispersed phase fluid in the convergent section.

* * * * *